Oct. 20, 1942.  R. LOEWY ET AL  2,299,583
VENDING MACHINE
Filed March 7, 1940  10 Sheets-Sheet 1

INVENTORS
Raymond Loewy
Harry A. Drew
BY
John V. Groat
ATTORNEY

Oct. 20, 1942.  R. LOEWY ET AL  2,299,583
VENDING MACHINE
Filed March 7, 1940   10 Sheets-Sheet 2

INVENTORS
Raymond Loewy
Harry A. Drew
BY John W. Marks
ATTORNEY

Oct. 20, 1942.   R. LOEWY ET AL   2,299,583
VENDING MACHINE
Filed March 7, 1940   10 Sheets-Sheet 3

INVENTOR
Raymond Loewy
Harry A. Drew
BY
John V. Smart
ATTORNEY

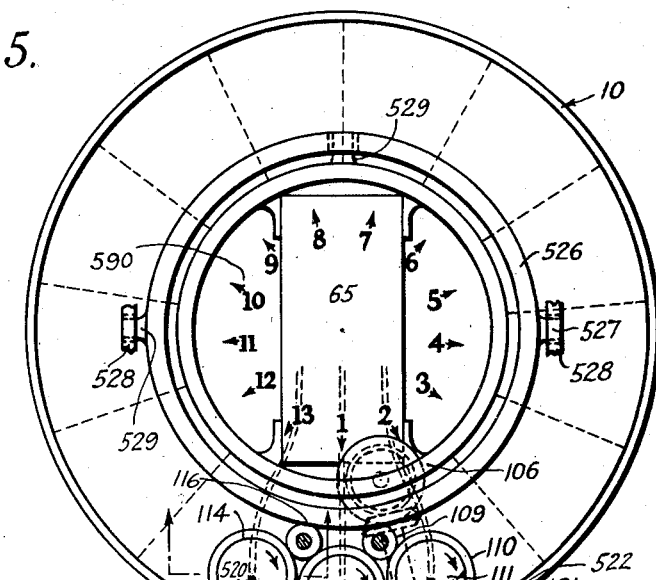

Oct. 20, 1942.   R. LOEWY ET AL   2,299,583
VENDING MACHINE
Filed March 7, 1940   10 Sheets-Sheet 5
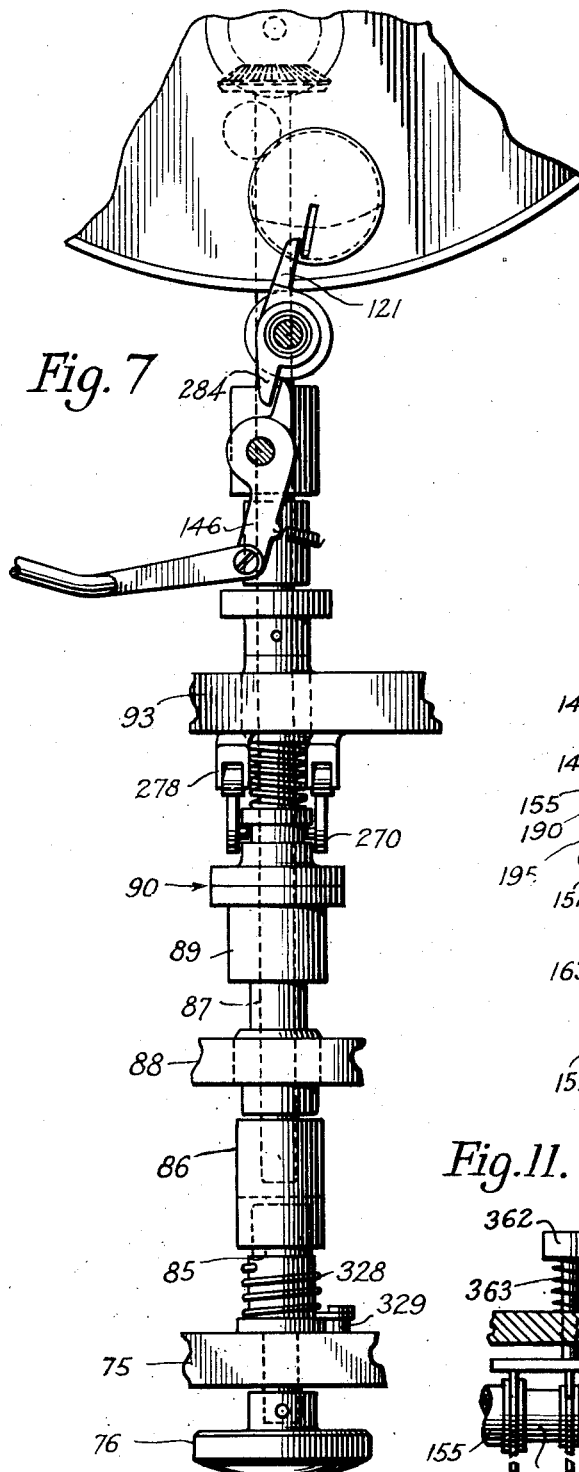
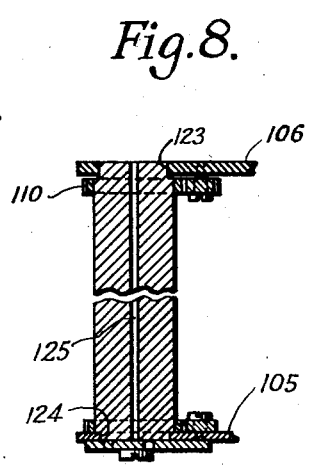
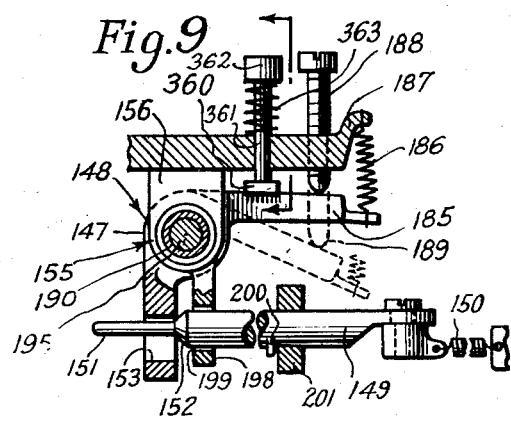
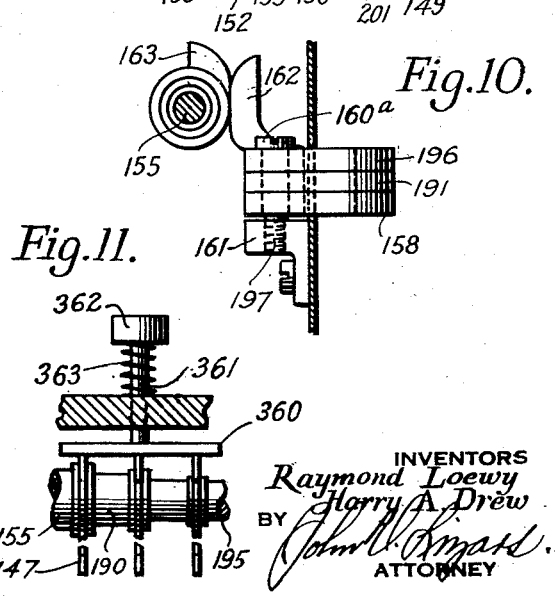
INVENTORS
Raymond Loewy
Harry A. Drew
BY
ATTORNEY

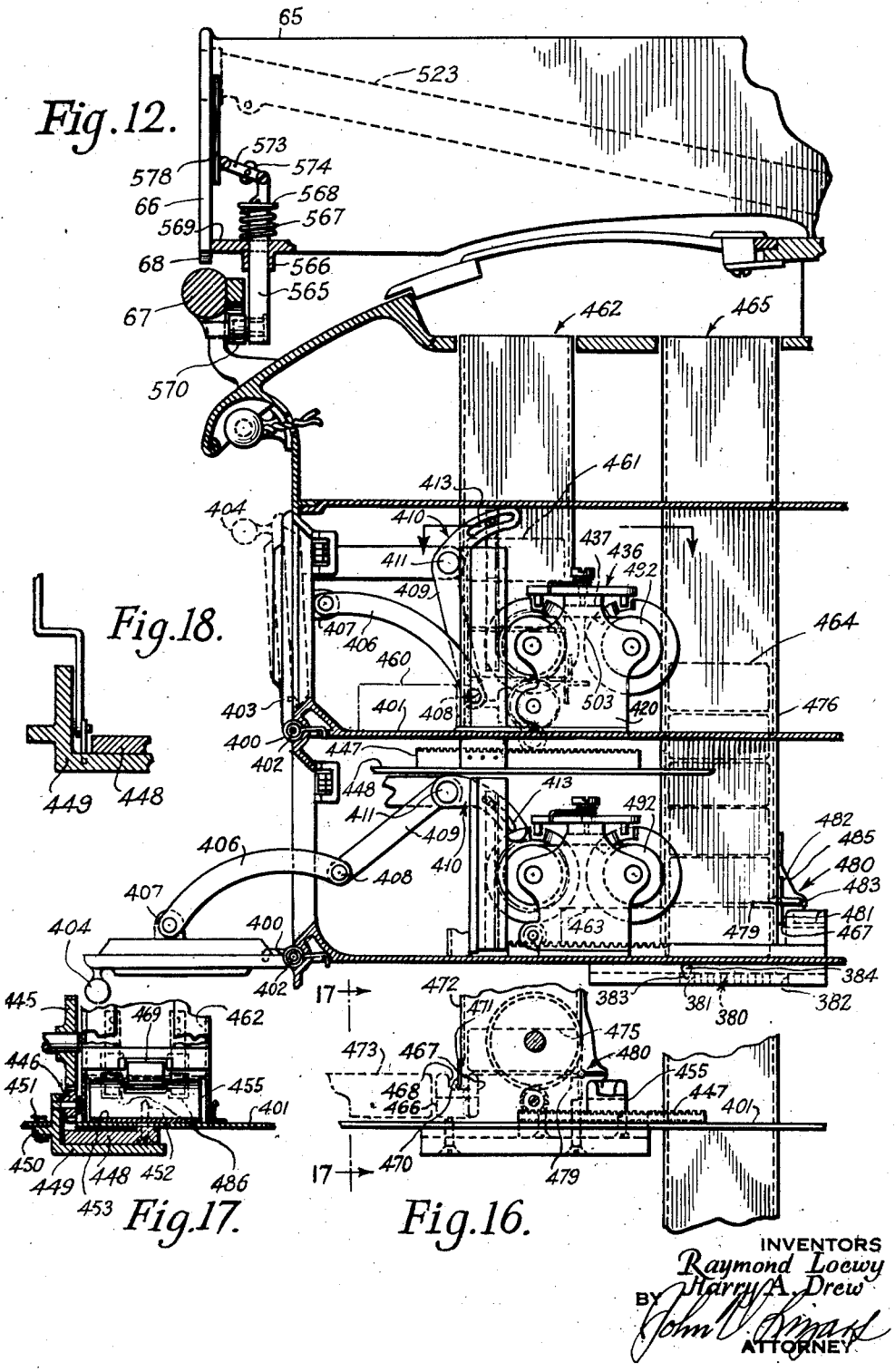

Oct. 20, 1942.   R. LOEWY ET AL   2,299,583
VENDING MACHINE
Filed March 7, 1940   10 Sheets-Sheet 7
Fig. 14.
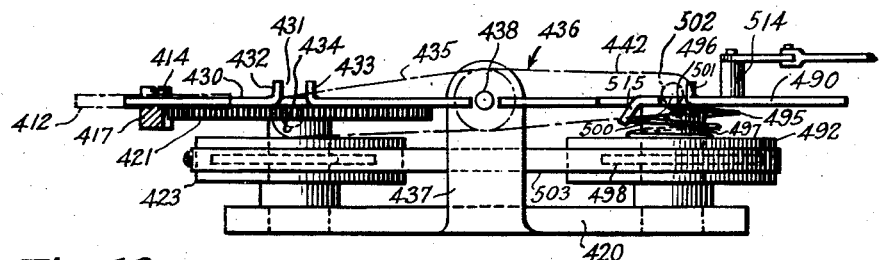
Fig. 13.
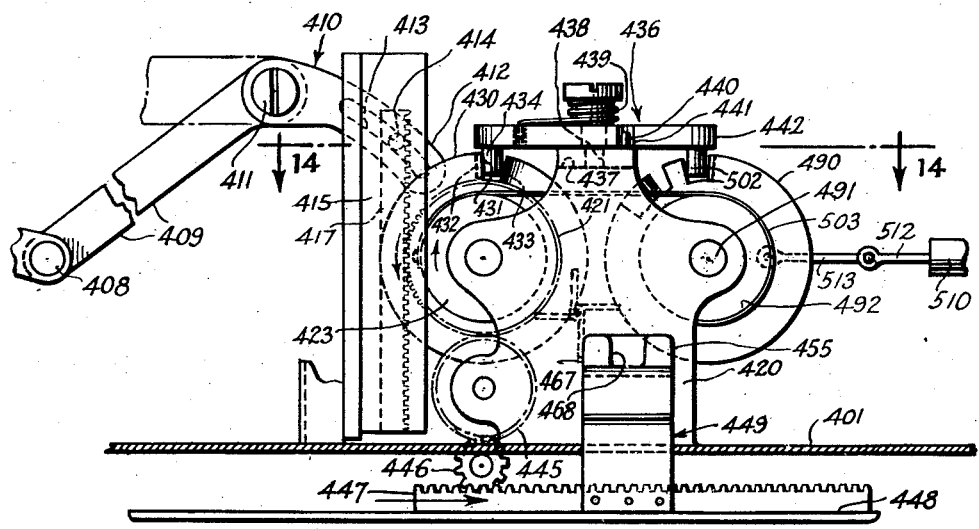
Fig. 20.   Fig. 19.   Fig. 15.
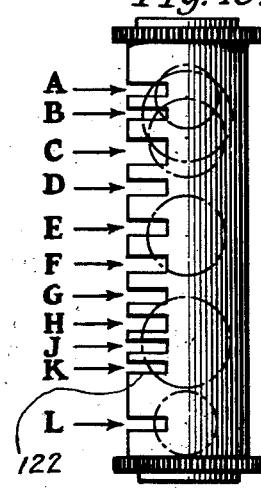
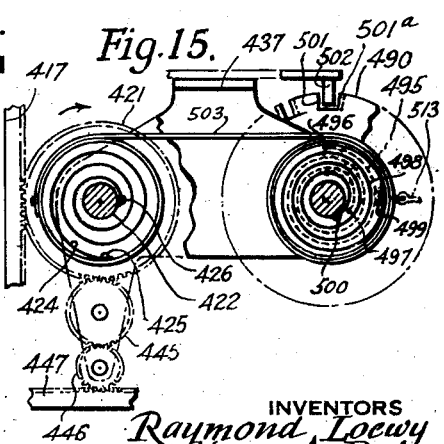
INVENTORS
Raymond Loewy
Harry A. Drew
BY
John V. Omak
ATTORNEY Oct. 20, 1942.  R. LOEWY ET AL  2,299,583
VENDING MACHINE
Filed March 7, 1940   10 Sheets-Sheet 8

INVENTORS
Raymond Loewy
BY Harry A. Drew
ATTORNEY

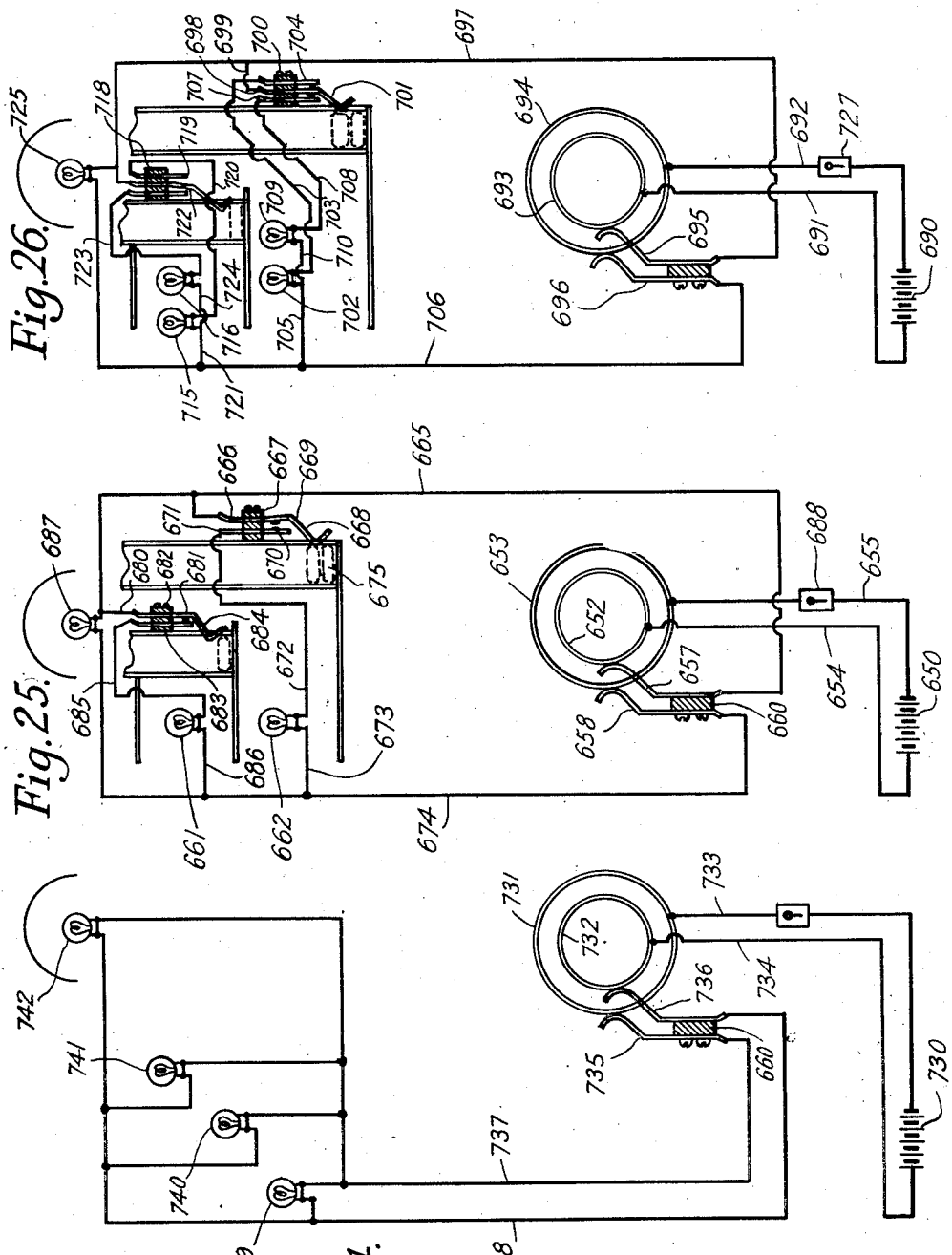

Oct. 20, 1942.   R. LOEWY ET AL   2,299,583
VENDING MACHINE
Filed March 7, 1940   10 Sheets-Sheet 10

INVENTORS
Raymond Loewy
Harry A. Drew
BY
ATTORNEY

Patented Oct. 20, 1942

2,299,583

UNITED STATES PATENT OFFICE 2,299,583

VENDING MACHINE

Raymond Loewy, New York, N. Y., and Harry A. Drew, Cliffside Park, N. J.

Application March 7, 1940, Serial No. 322,744

5 Claims. (Cl. 194—88)

Our invention relates to new and useful improvements in vending machines and more particularly to portable vending machines of a type adapted for use in service stations and the like, and in which the mobile mounting of the machine permits of its being rolled to a position adjacent a motor car while the latter is being serviced.

A motorist frequently wishes to purchase refreshments, tobacco, etc. while his automobile is being refueled and serviced. The present invention is embodied in a device which will greatly facilitate fulfilling the motorist's requirements and because of its wholly automatic character the service station operator is relieved of the necessity of providing a counter attendant to serve such purchases.

It is accordingly one object of the invention to provide a device of the character described which shall be simple and economical of manufacture, highly mobile and adapted to make available a wide selection of products of different character.

It is yet another object of the invention to provide a vending device which shall be readily movable to a position accessible for use, and in which discontinuance of the moving force will automatically serve to lock the device in the position in which it is left.

Other objects and advantages will be apparent in the accompanying drawings taken in combination with the following description of a preferred embodiment thereof, although it will be understood that many modifications may be made in the invention without departing from the spirit thereof as set forth in the appended claims.

Referring now to the drawings:

Fig. 5 is an enlarged plan view of part of the selecting mechanism shown in Fig. 3.

Fig. 6 is an enlarged detailed view of certain door controlling means shown in Fig. 5.

Fig. 7 is an enlarged detail view of part of the mechanism of Fig. 5.

Fig. 8 is an enlarged detail view taken along the line 8—8 of Fig. 2.

Fig. 9 is an enlarged detail view taken along the line 9—9 of Fig. 5.

Fig. 10 is an enlarged detailed view taken along the line 10—10 of Fig. 5.

Fig. 11 is an end elevational view of the structural detail shown in Fig. 9.

Fig. 12 is an enlarged elevational view of an upper and lower dispensing compartment together with the compartment door controlling means.

Fig. 13 is an enlarged elevation of the door controlling mechanism shown in Fig. 12.

Fig. 14 is a plan view of the mechanism shown in Fig. 13.

Fig. 15 is a detailed view of part of the structure shown in Figs. 13 and 14.

Fig. 16 illustrates the position of certain of the parts of the package ejecting mechanism when the door is in both open and closed positions.

Fig. 17 is an enlarged end elevation of part of the package ejecting mechanism shown in Figs. 12, 13 and 16.

Fig. 18 is an enlarged detailed view of a full stroke mechanism employed in the door controlling means of Figs. 12 and 16.

Fig. 19 is an enlarged elevational view of a coin slot employed in the structure shown in Figs. 3 and 5.

Fig. 20 is a table indicating some of the coin combinations which may be utilized in the operation of the device.

Fig. 24 is a diagram of an illuminating circuit used in connection with the invention.

Fig. 25 is a diagram of a warning signal circuit energized as an incident to the commodity in any compartment of the machine becoming exhausted.

Fig. 26 is a diagram of an alternative form of the circuit shown in Fig. 25.

Fig. 27 is a fragmentary elevation of manual means to release the doors of the compartments shown in Fig. 2.

Fig. 28 is a fragmentary elevation of part of the coin handling mechanism.

Figure 1:
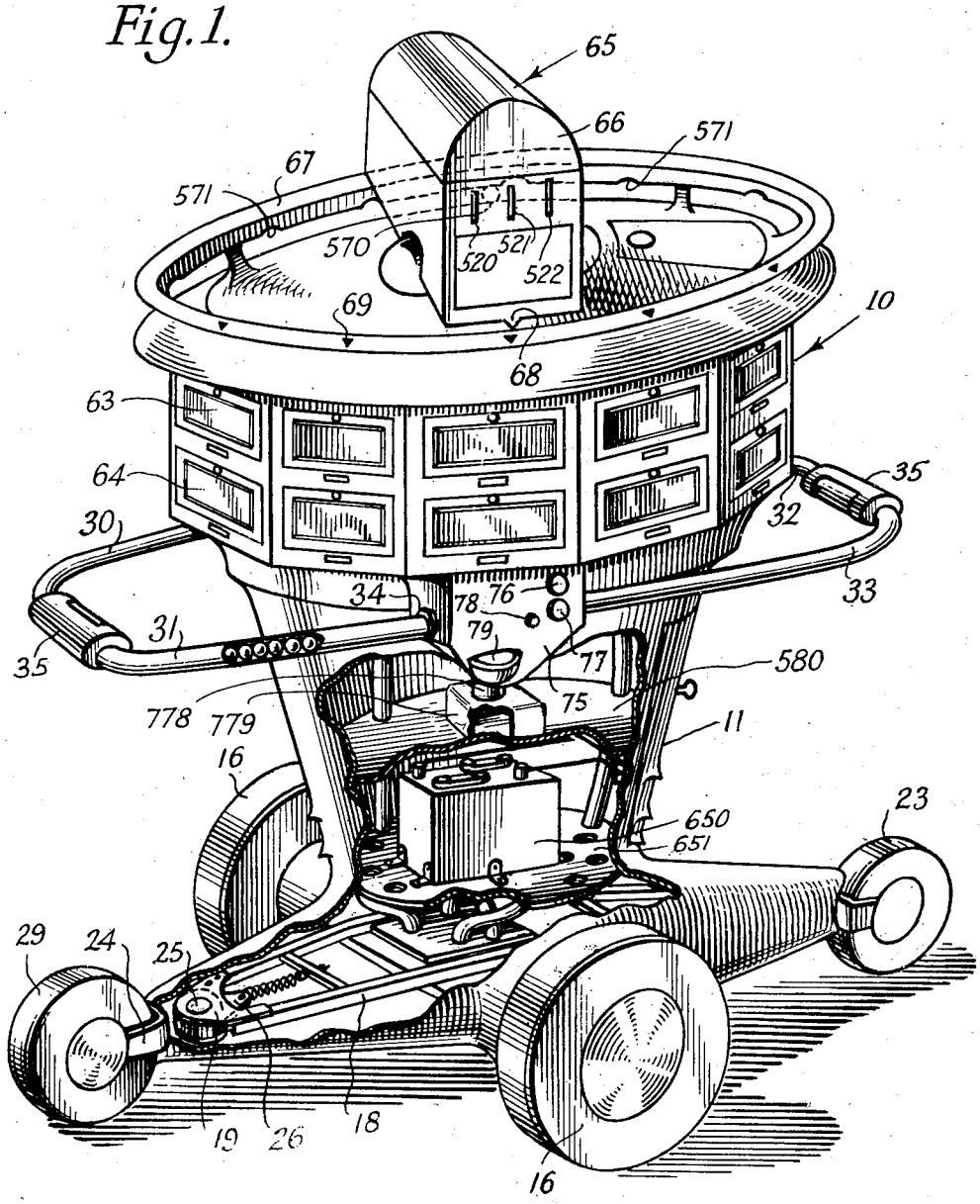
Fig. 1 is a perspective view of a device embodying the invention, part of the casing being broken away to reveal the interior construction.

Referring now particularly to Fig. 1.

The preferred embodiment of the invention is shown in the form of a mobile unit which may be readily wheeled from place to place to accommodate prospective purchasers. Generally, the device comprises an upper rotatable vending head 10 which surmounts a lower, or body portion 11.

Figure 21:
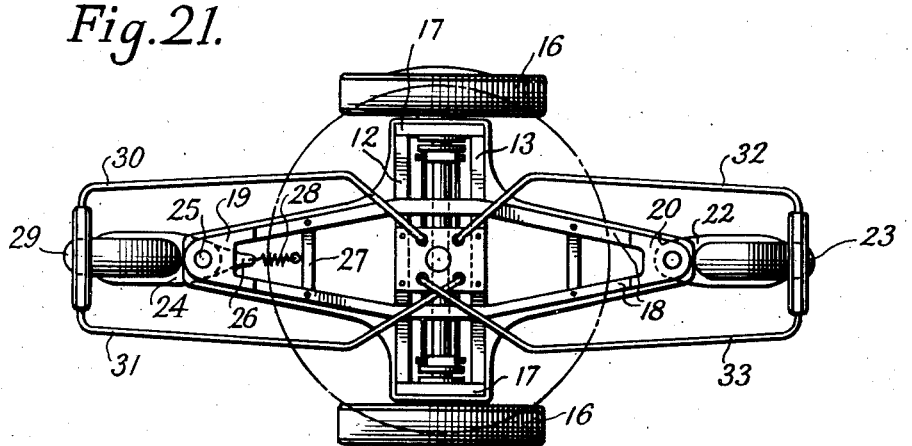
Fig. 21 is a top plan view of a preferred form of chassis.
Figure 22:
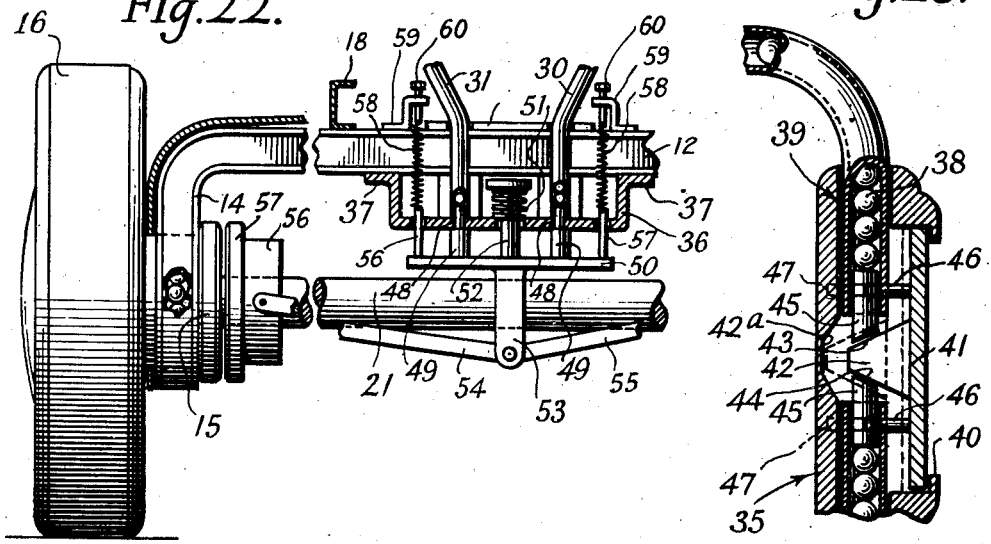
Fig. 22 is an enlarged elevational view of part of the chassis structure shown in Fig. 21.

The body portion of the machine is mounted on a chassis illustrated more particularly in Figures 21 and 22 to which reference will now be had.

A pair of similar, spaced cross frames 12 and 13, are turned downwardly adjacent their respective ends as indicated particularly at 14 in Fig. 22 to provide arcuate bearing seats for hubs 15 fixed to wheels 16. Tie pieces 17, connected between the cross frame members function to hold the latter in rigid spaced relationship and at the same time to maintain the hubs 15 in the position shown in the drawings.

The cross frames 12 and 13 support a pair of overlying longitudinally extending frame members 18 which, as will be seen, are preferably U shaped channels united at their respective ends by similar bearing plates 19 and 20. A fixed axle shaft 21, extends between, and is journalled at its ends in the internal body of hubs 15 thus lending rigidity to the chassis.

A yoke 22, anchored in any desirable way between the bearing plates 20 operatively supports a wheel 23.

A yoke 24 is operatively supported between the bearing plates 19 for rotation on a vertical axis defined by a bearing pin 25, the respective ends of which are engaged in suitable apertures formed in the bearing plates. As will be obvious from an examination of Figs. 1 and 25, the yoke 24 is provided with an inwardly extending tongue 26 between which, and a cross bar 27, a spring 28 is connected. It will be obvious that spring 28 will normally act to maintain yoke 24 in alignment with yoke 22. A wheel 29 carried by the outer ends of the arms of yoke 24 completes the wheeled equipment of the chassis.

Reverting now to Fig. 1: it will be seen that the wheels 16 are relatively larger in diameter than wheels 23 and 29, as a consequence of which only one of the latter two wheels will contact the ground.

Furthermore, the construction described is such that when it is desirable to move the device, its entire weight can be balanced upon the wheels 16, thus raising wheels 22 and 29 from the ground so as to permit of free manipulation in extremely small areas.

The wheel 29, by virtue of its pivotal support on the pin 25, is capable of being steered so that if desired the device may be permitted to rest on the wheels 16 and the wheel 29, and yet be moved about with great facility.

To prevent free rolling of the device such as may be induced by the drainage angle of filling station floors, we have provided means to lock the machine in any position to which it may be moved. To this end, pairs of similar, rigid steel tubes project through the lower body portion 11 of the machine, one such pair being indicated as 30 and 31 in Figure 1, a second pair being shown at 32 and 33. The external portions of these pairs of tubes lie in a common plane extending longitudinally of the axis of the wheels 22 and 29 as will be clearly seen in Figs. 1 and 21. It will be understood that both pairs of tubes 30, 31 and 32, 33 are rigidly connected to the body portion 11, as for example by collars or nuts such as is indicated at 34 in Fig. 1. The respective outer ends of the pairs of tubes are turned toward each other adjacent their ends, as shown in detail in Fig. 23, and similar hand grips 35 are provided at their respective junctures.

Referring now to Figs. 21 and 22. The tube 30 extends downwardly through the lower body portion of the device to terminate at a bracket plate 36.

As shown particularly in Fig. 22, the bracket plate 36 is turned upwardly throughout the length of its lateral edges to provide flanges 37 which engage and are secured to the under surfaces of the cross bars 12 and 13.

Now referring again to Fig. 21, the tube 31 will be seen to terminate at the plate 36 in a position diametrically opposite to that of the terminus of tube 30.

Similarly, tubes 32 and 33 project inwardly and downwardly through the housing to terminate at the plate 36 in respectively opposite positions from those of tubes 30 and 31.

Figure 23:
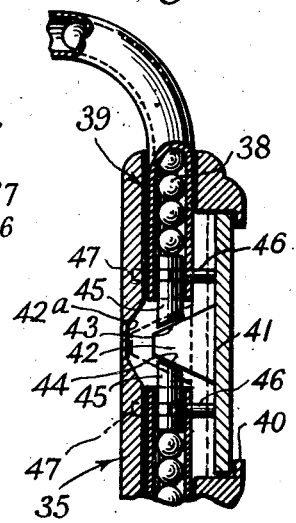
Fig. 23 is a detailed view of part of the means employed to control the chassis shown in Fig. 21.

Throughout their lengths, the tubes 30 to 33 inclusive, as indicated in Fig. 23, are filled with bearing balls 38 extending from a point adjacent the lower ends of the tubes (Fig. 22) to a point adjacent the outer ends of the tubes as shown in Fig. 23. Now considering the construction of Fig. 23, the hand grip 35 as has been adverted to, embraces the inwardly turned ends of the tubes, being provided with a central bore 39 for that purpose. Intermediate their ends, the hand grips are cut away as shown at 40 to provide a recess in which a movable segment 41 is supported.

Compression or squeezing of the segment 41 functions to communicate movement to the bearing balls 38. In this connection, the segment 41 is formed with a wedge shaped member 42 which lies between, and substantially in a plane common to the diameter of the ends of the respective tubes. Wedge 42 is formed with camming surfaces 43 and 44 which engage the complementary surfaces of plungers 45, freely supported in the ends of the tubes. To prevent rotation of plungers 45, with consequent displacement of their camming surfaces from contact with the camming surfaces of wedge 42, pins 46 are fixed to, and project inwardly from the inner surface of segment 41, and the inner wall of the hand grip is counterbored at 47 to permit the movable segment 41 to assume the extreme inner or leftward position as indicated in dotted outline in Fig. 23. Similarly, the inner wall of the hand grip is cut away as shown at 42—A to accommodate the wedge shaped member 42 when the latter assumes the dotted line position shown in the drawing. Now it will be apparent that compression of the segment 41 of the hand grip 35 will operate to drive the bearing balls 38 downwardly through their respective tubes 30, 31 or 32, 33 dependent upon which one of the two hand grips is engaged. As will now be explained, this last mentioned movement of the bearing balls 38 is utilized to unlock the wheel braking mechanism.

Reverting to Fig. 22, the bracket plate 36 is formed with four apertures 48, one such aperture being aligned with the lower end of each of the respective tubes 30 to 33 inclusive. A shouldered piston 49 is freely slidable in each of said apertures and their respective lower ends rest against a floating brake operating plate 50. The plate 50 is yieldably maintained in the position shown in Fig 22 by a spring 51 carried on a pin 52 which projects upwardly from plate 50 through a suitable aperture in the bracket 36. Spring 51 acts between the shouldered upper end of pin 52 and the surface of bracket 36 to exert an upwardly acting force upon the plate 50. It will be understood that the upward movement of plate 50 under the influence of spring 51 is limited by engagement of the upper ends of shouldered pistons 49 with the under surface of bracket 36.

A downwardly projecting arm 53, formed integrally with, or fixed to the under surface of plate 50, is operatively connected adjacent its lower end with links 54 and 55. Link 54 is connected to a non-rotatable brake element 56 which is preferably keyed to the shaft 21 so as to permit of free sliding movement thereon. Brake element 56 is provided with a clutching face 57 which co-acts with a face on the rotatable hub member 15.

It will now be obvious that compression of the movable segment 41 of hand grip 35 will cause the bearing balls 38 to drive a pair of the headed pistons 49 downwardly against the action of spring 51. This movement of plate 50, communicated to arm 53, will operate to withdraw the brake element 56 from engagement with the face on the rotatable hub member 15 thus permitting wheel 16 to rotate. It will be understood that a similar braking construction is employed with respect to the second wheel 16 and that this mechanism (not shown) will be actuated by the link 55 so that both wheels 21 will be released by operation of hand grip segment 41.

It was pointed out heretofore that the hand grips on the pairs of tubes 30, 31 and 32, 33 were identical in construction and operation, so that grasping of either one and compression of segment 41 will serve to release the brakes and thus permit free wheeling of the device to any desired position. Subsequent releasing of the hand grips permits the spring 51 to again elevate the plate 50, driving the ball bearings 38 to their original position as shown in Fig. 23, thus returning the segment 41 from its dotted line position to its full line position.

To prevent the possibility of cocking or tilting of the plate 50 and for the further purpose of controlling the extent of the brake releasing force, we have provided the following construction: Pins 56, connected to and extending upwardly from the plate 50 adjacent its four corners project through suitable apertures 57 in the bracket 36 one such aperture being provided for each of the four pins 56.

The upper ends of pins 56 are connected by means of springs 58 to angle lugs 59 by means of adjusting screws 60. The lugs 59 are rigidly attached to the upper surfaces of cross-frame members 12 and 13 so that rotation of the adjusting screws 60 will be effective to regulate the tension exerted by the springs 58. Hence the plate 50 will be urged upwardly by a uniform force at each of its four corners.

Figure 2:
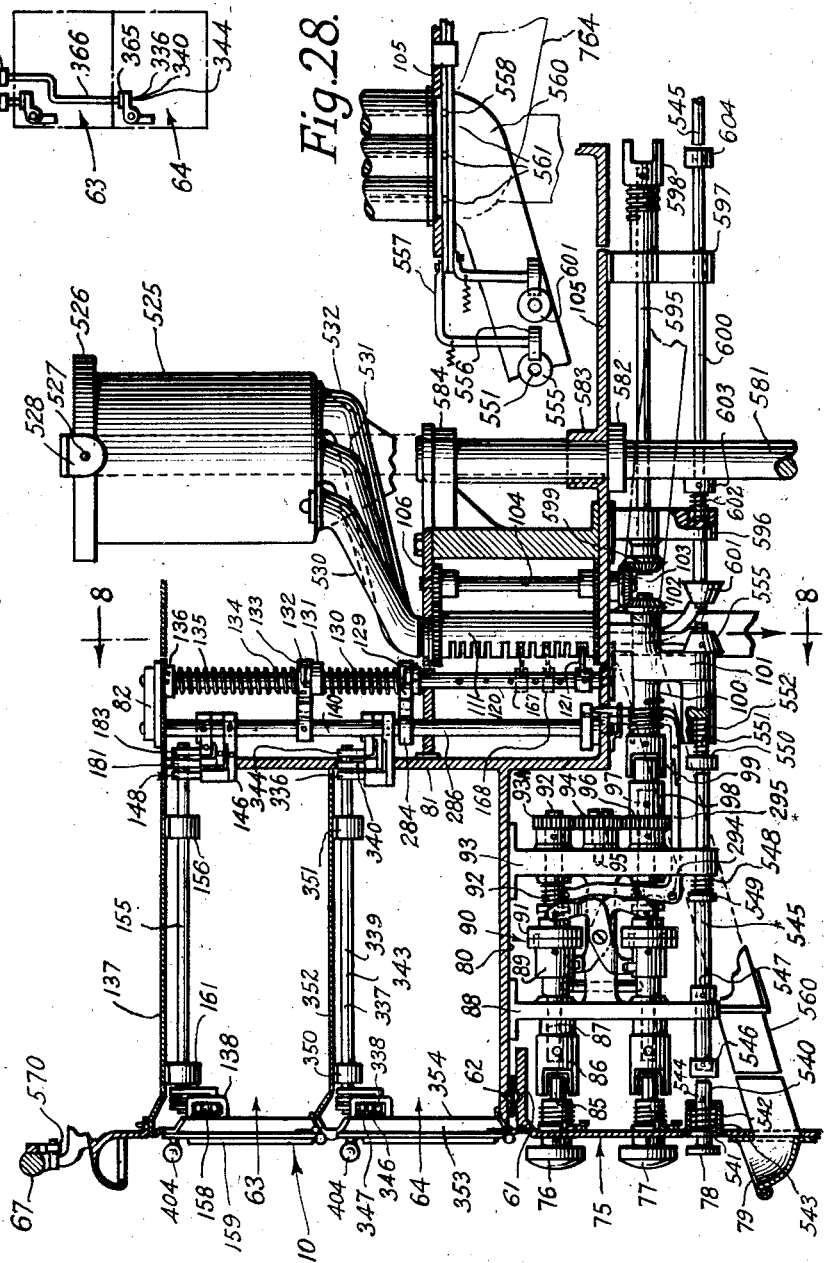
Fig. 2 is a fragmentary elevational view showing one form of the selecting mechanism.

Reverting now to Figs. 1 and 2, the upper edge of the lower body portion 11 is formed to define a shelf 61 upon which an annular ring bearing 62 is carried. The ring bearing 62 enables the upper portion of the machine 10, which has heretofore been referred to as the vending head, to be rotated so as to present any one of several pairs of radially arranged dispensing compartments. The upper ones of the pairs of dispensing compartments are indicated at 63 in Figs. 1 and 2 and the lower compartments are identified by the numeral 64.

The vending head is rotated for the purpose of placing any one of its pairs of upper and lower compartments in operative alignment with compartment door releasing mechanism as shown more particularly in Figs. 1 to 13, inclusive.

As shown in Fig. 1, a stationary coin receptacle 65 extends diametrically across the top of the machine. Its end walls 66 lie substantially in the plane of a tangent to a hand rail 67 carried on the movable head 10. Thus when the contents of any particular compartment is desired the purchaser grasps rail 67 and rotates the movable head 10 until a mark 69 on the hand rail, corresponding to that compartment, is aligned with an arrow 68 on the lower edge of end wall 66 of coin receptacle 65. It will be understood that a mark 69, is provided on the hand rail for each pair of compartments 63 and 64. Supported on the lower, or stationary part of the device is an outwardly extending portion 75 of the housing 11 which operatively supports an upper door releasing knob 76, a lower door releasing knob 77, a coin return knob 78, and a coin return chute 79.

Referring now particularly to Fig. 2 in which an upper and lower compartment are shown in operative alignment with the beforementioned releasing mechanisms:

The upper compartment releasing knob 76 is mounted on a short shaft 85, the inner end of which forms one element of a coupling member including a bifurcated part 86 pinned to a shaft 87 which in turn is journalled in a downwardly projecting bearing bracket 88. Shaft 87 carries one element 89 of a clutch 90, the second part of which 91, is carried on a shaft 92 journalled in a downwardly projecting bearing bracket 93. Bearing brackets 88 and 93 are fixed to the under surface of the bottom wall 80 of lower compartment 64 and consequently partake of the movement of the latter. A pinion 93A is fixed to the inner end of shaft 92 and meshes with an idler pinion 94 carried by a stud 95 which in turn is supported by the bracket 93.

The idler pinion 94 meshes with a gear 96 keyed to a short shaft 97 which forms one element of a coupling 98 which includes a bifurcated part 99. The coupling part 99 is carried by a short shaft 100 which is journalled in a bearing bracket 101, the inner end of the shaft being provided with a bevelled pinion 102. Bevelled pinion 102 meshes with a corresponding pinion 103 carried on the lower end of a shaft 104 which is journalled adjacent its lower extremity in a shelf 105 and at its upper end in the plate 106. Between the shelf 105 and bearing plate 106, the shaft 104 is fitted with similar gears 107 and 108 which, as will be seen from an examination of Fig. 3, form meshing engagements with upper and lower idler gears 109.

The idler gears 109 are meshed with upper and lower ring gears 110 which are fixed adjacent the respective upper and lower ends to a coin cylinder 111.

Referring again to Fig. 5, it will be noted that the idler gears 109 mesh additionally with ring gears 112 of a coin cylinder 113. Spaced beyond the coin cylinder 113 is a third coin cylinder 114, which, like the cylinders 111 and 113, is provided with upper and lower ring gears 115 arranged to be driven by upper and lower idler pinions 116 which communicate movement from the coin cylinder 113 to the coin cylinder 114. Now it will be obvious that the coin cylinders are simultaneously rotated identical amounts by any movement of the upper compartment knob 76 through the action of gear 93, idler 94, gear 96, bevelled pinion 102, bevelled pinion 103 and gears 107 and 108 on shaft 104.

The beforementioned movement of the coin cylinders functions to release the upper compartment door, and since the mechanisms associated with each cylinder for this purpose are identical, it will suffice to describe that which is directly actuated by one of them.

A vertically disposed shaft 120 journalled adjacent its upper and lower ends in the rotatable section of the device is provided with a finger 121 which may be positioned to register with any one of a plurality of slots 122 formed in that edge of the coin cylinder which is adjacent to the shaft 120. The coin cylinder 111 is that one which is intended for the reception of 25¢ pieces, it being contemplated that as many as 5 such coins may rest edge-on-edge in the cylinder. The finger 121 is accordingly adapted to occupy any one of 5 positions in which it registers with one of the slots 122 and is effectively placed in the path of a coin during rotation of the coin cylinder.

At this point, reference may be made to Fig. 8 for a more detailed understanding of the construction of the coin cylinder:

The body portion of the cylinder may be solid and of cylindrical form externally, its upper and lower ends as indicated at 123 and 124 being undercut to provide bearing surfaces which are journalled in the shelf 105 and the bracket 106. A longitudinally extending slot 125, of sufficient width to freely accommodate the coin is formed in the cylinder and extends throughout its length, communicating at top and bottom with the ends of the cylinder. It will be apparent that the body of the cylinder is of sufficient strength and rigidity to exert a driving force upon the finger 121 through the medium of a coin resting in its slot 125.

Again referring to Figs. 2 and 3; above the bracket 106, shaft 120 is provided with a fixed collar 126 which carries an upwardly projecting pin 127 which operates in an arcuate slot 128 formed in the under surface of a compartment door release finger 129. Compartment release finger 129 is normally urged into engagement with collar pin 127 by a torsion spring 130 which surrounds shaft 120 and is anchored at its upper end to a collar 131 and at its lower end to the release finger 129. Thus the release finger 129 is yieldably urged to the position shown in Figs. 2 and 5, through the action of spring 130.

An upper compartment door release finger 132 is freely mounted on shaft 120 and rides upon the collar 131 which, like the collar 126, is provided with an upstanding pin 133 arranged to be received in an arcuate slot 135 formed in the under surface of finger 132. A torsion spring 135 which surrounds the upper part of shaft 120 is anchored at its upper end to a collar 136 and at its lower end to the finger 132, so as to tend to rotate the latter to the position shown in the drawings in which the left end of its arcuate slot engages the pin 133. For the purposes of the description thus far, it will suffice to detail the result of movement of release finger 132.

A shaft 140 is journalled in the rotatable section of the machine in parallel relation with shaft 120, its lower end being supported in the horizontal extension of the rear wall 81 of the upper and lower compartments while the upper end of the shaft 140 is journalled in a bearing bracket 82 which also serves to journal the upper end of shaft 120. A collar finger 145 is fixed to shaft 140 in operative alignment with compartment door release finger 132, so that rotation of the latter part will communicate arcuate movement to shaft 140 through collar finger 145.

Above collar finger 145 and pinned to shaft 140 is a latch cam pusher arm 146 which as will now be seen by reference to Fig. 5 is arranged to actuate an arm 147, Fig. 9, of a bell crank 148 through the medium of a pusher link 149. Pusher link 149 is pivotally connected to pusher arm 146 and the unit comprising these two parts is normally urged in a counterclockwise direction as viewed in Fig. 5 by a tensile spring 150. The opposite end of pusher link 149 as shown in Fig. 9 is reduced in diameter at 151 so as to provide a shoulder 152 which said shoulder is arranged to abut the edge of an aperture 153 formed adjacent the lower part of arm 147. It will be obvious that the relationship between pusher link 149 and arm 147 of bell crank 148 is such that the link may operate to rock the arm in a clockwise direction, or; the arm may be moved independently of the link in the same direction.

The bell crank 148 is mounted on the inner end of a sleeve shaft 155 journalled at its inner end in a bracket 156, and at its forward end in a bearing bracket 161 both of which brackets depend from the upper wall 137 of the upper compartment. At its forward end, sleeve shaft 155 carries a latch 158 which normally occupies a position in which it is effective to retain the door 159 of the upper compartment 63 in locked position. To this end a bracket 138 is fixed to the rear surface of door 159 and the end of latch 158 normally lies between the surface of the door and the rear wall of the bracket so as to effectually prevent opening of the door. On the other hand, when pusher link 149 is actuated as a result of the rotation of shaft 120 under the influence of a coin in the coin cylinder 110, door release finger 132 will function to rock collar finger 145, thus rotating shaft 140 and its latch cam pusher arm 146. As has been previously described, the movement of latch cam pusher arm 146 is communicated to pusher link 149, thus rocking arm 147 and consequently shaft 155, to thus move door latch 158 to ineffective position.

As will be seen in Figs. 5, 6 and 10, the latch 158 is pivoted intermediate its ends on a stud 160 which in turn is supported on the side wall of the compartment by the bracket 161. The rearwardly projecting arm of latch 158 is turned upwardly at 162 to form a cam finger arranged to be acted upon by a cam 163, fixed to the outer end of shaft 155. Finger 162 is yieldably urged into engagement with cam 163 by a leaf spring 164 anchored to the forward bearing bracket 156.

In the preceding discussion, it was assumed that the upper compartment door under discussion was intended to be released by insertion of a single 25¢ coin in the machine. It will be noted, however, that the door 159 is retained in locked position by any one or all of three latches generally similar to the latch 158. Thus the door opening operation may be controlled by any one of the coin cylinders 111, 113 and 114 (Fig. 3) or, in the alternative by any combination or all of them. Now consider this latter aspect of the invention: a shaft 165 similar in all respects to the shaft 120 and similarly supported, is mounted opposite the coin cylinder 113 and a shaft 166 like the shafts 120 and 165 is mounted opposite the coin cylinder 114. Adjustable fingers 167 and 168, similar in all respects to the finger 121 are supported upon the shafts 165 and 166 and arranged to sweep the slots of the coin cylinders 113 and 114 as is the finger 121 with respect to the coin slots of the cylinder 111.

Mounted opposite the shafts 165 and 166 are similar shafts 170 and 171 which correspond functionally and structurally with the shaft 140 and like the latter, are provided with collar fingers 172 and 173. The collar finger 172 is arranged to actuate a pusher link 175 through an arm 180 and the collar finger 173 is arranged to actuate a pusher 176 through an arm 181. The pusher links 175 and 176, as will be seen particularly in Fig. 5, are functionally similar, although structurally different from the pusher link 149. Thus, the pusher links 175 and 176 are effective to rock downwardly extending arms of independent bell cranks similar to and carried to the bell crank 148 (Fig. 9). It will be obvious that these latter bell cranks are carried by independent ones of the group of telescoping shafts of which the shaft which carries bell crank 148 is one.

Now reverting to the shaft 155 and its bell crank 148, in addition to arm 147, the bell crank 148 includes an arm 185 which is normally urged in a counterclockwise direction by a spring 186 acting between the end of the arm and a bracket plate 187. Hence the bell crank 148 tends to rotate shaft 155 so as to position latch 158 in its door locking relationship. Furthermore, a set screw 188 which is threaded into the bracket 187 is capable of adjustment to the dotted line position indicated at 189 in which arm 185 is rotated sufficiently to maintain the latch 158 out of locking engagement with the door 159. Bell crank 181 is mounted on a tubular shaft 190 which is within the shaft 155 and actuates at its forward end a latch 191. Like the bell crank 148, the crank 181 is formed with a second arm similar in all respects to the arm 185 of bell crank 148 and, like the latter, the former arm is urged in a counterclockwise direction by a spring similar to the spring 186 and similarly mounted, hence the latch 191 is also yieldably retained in door locking position. A set screw structurally and functionally similar to the set screw 188 is arranged to engage the second arm of bell crank 181 so as to disable the latch 191.

The bell crank 183 is mounted on the inner end of a solid shaft 195 which lies within the tubular shafts 155 and 190. Like the bell cranks 148 and 181 the crank 183 is formed with an arm similar to the arm 185, of the bell crank 148. The second arm of bell crank 183 is urged in a counterclockwise direction by a tensile spring similar to the spring 186 and similarly mounted. A set screw not unlike the set screw 188 which is also screwed into bracket 187, is adapted to engage the second arm of bell crank 183 so as to maintain the latter in an angular position corresponding to that shown in dotted ouline for arm 185. Thus a door latch 196, actuated by central shaft 195, is adapted to be engaged with or disengaged from the door locking bracket 138.

Reverting now to the description of the manner in which the upper compartment door 159 is released through the operation of a 25¢ coin in the coin cylinder 111: It will of course be understood that under the circumstances enumerated and in the light of the fact that it was presumed that no coins would be in the cylinders 113 and 114, door latches 191 and 196 would have been disabled by a previous setting of the set screws 188 so as to leave control of the door exclusively to the latch 158.

It will additionally be understood that if it were desired to cause the opening of the door 159 to be dependent jointly upon the presence of coins in the cylinders 113 and 114, that the pusher links 175 and 176 would be rendered effective by retraction of the set screws 188 which, under the circumstances just described, have served to disable their corresponding bell cranks 181 and 183.

The pusher links 149, 175 and 176 are guided for reciprocatory movement and secured against displacement from their respective bell-cranks by a guide plate 198 which depends from the top wall 137 and is formed with similar apertures 199 in which the pusher links freely slide. A stop pin 200, fixed in each pusher link, acts against a stop plate 201 through which each link passes, to prevent the return spring 150, and its counter-parts (not shown) from withdrawing the links from engagement with their respective bell-cranks.

Now considering the means employed to control the opening of door 253 of lower compartment 64: Reference may be had to Fig. 2, in which the doors and door operating mechanism of both compartments is shown, as well as to Figs. 3 and 7 in which the door operating mechanism alone is disclosed on a larger scale.

The lower compartment door operating knob 77 is carried on a short shaft 250 journalled in the extension 79 of the stationary part of the housing and forms one element of a coupling of which the second part 251 is carried on a shaft 252 journalled in the bearing bracket 88. A clutch 253 generally similar to the clutch 90 is arranged to communicate movement from knob 77 and shaft 252 to the gear 96, which, as has been previously indicated, is supported on a short shaft 97.

Reverting now to clutch 253: One element of the clutch, 255, is pinned to short shaft 252, the second element 256 being slidably keyed to the shaft 97. Any positive form of driving engagement may be utilized between the clutch elements 255 and 256 and in the present instance a plurality of pins 257 fixed to one of the elements are arranged to engage suitable bores provided in the other.

Now it will be apparent that rotation of lower knob 77 is adapted to communicate movement though coupling 250—251 directly to pinion 102, and hence shaft 104, so as to effect rotary movement of the coin cylinders 111, 113, 114 as has been previously described in connection with the operation of the upper compartment knob 76.

In order to prevent interference between the functional operations of the device, means is provided to prevent rotation of the upper compartment knob 76, when it is desired to open a lower compartment by operation of knob 77. To this latter end the upper knob 76 is automatically disconnected as an incident to operation of the knob 77.

Figures 3, 4:
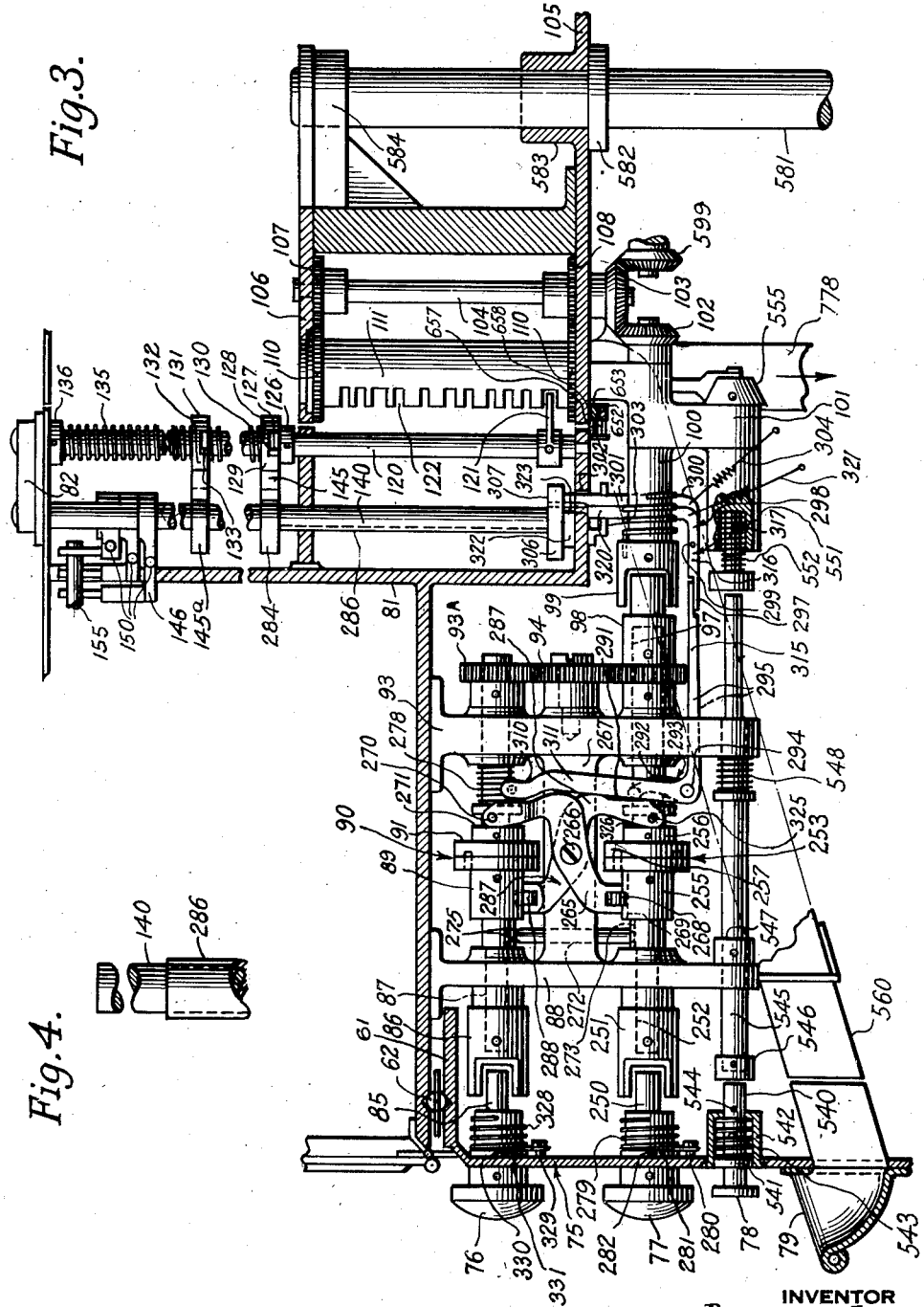
Fig. 3 is an enlarged elevation of certain parts of the selecting mechanism shown in Fig. 2.
Fig. 4 is an enlarged detailed view of part of the mechanism shown in Fig. 3.

Referring particularly to Fig. 3, a rocker arm 265 is freely pivoted at 266 on a bearing bracket 267 which extends between, and is formed integrally with the bearing brackets 88 and 93. One arm of rocker 265 carries a roller 268 which rides in a short arcuate slot or cam section 269 formed in the peripheral surface of the hub of clutch member 255. The second upwardly turned arm of rocker 265 is provided with a roller 270 which lies in a continuous circumferential groove 271 formed in the hub of slidable element 91 of clutch member 90. As has been pointed out, the cam groove 269 in the hub of clutch element 255 is very short, so that a rocking movement is imparted to the rocker arm through its roller 268 immediately upon commencing a turning operation of knob 77. Thus rocker arm 265 will be turned in a clockwise direction as viewed in the drawings to cause its upwardly projecting arm to disengage clutch element 91 from clutch 89. To further safeguard the device against misoperation, we provide means to actually lock the upper compartment knob against movement as an incident to operation of the lower knob. As shown more clearly in Fig. 3, a locking pin 272, slidably mounted in bearing bracket 267 is normally positioned with its lower end in engagement with a short groove 273, formed in shaft 252 to the right of bearing bracket 88. When the pin 272 is in the position described, its upper end is substantially in bearing engagement with the surface of short shaft 87 and in alignment with a bore 275 which is formed in the shaft 87. It will be understood that since both the upper and lower door opening knobs are caused to return to a fixed initial position after each operation, that the cam grooves 273 and bore 275 will always align themselves with the locking pin 272.

Now when the lower compartment knob 77 is rotated, locking pin 272 will immediately rise to engage bore 275 in shaft 87, thereby locking the upper compartment knob 76 in inoperative position. Upon completion of rotation of knob 76, and its return to initial position, locking pin 272 will again drop into groove 273, thereby unlocking the upper compartment knob and the clutch element 255 will return to the position in which its cam groove 269 receives the roller 268 of rocker 265, thus permitting the clutch element 91 to re-establish a driving engagement between the upper compartment knob 76 and the coin cylinders. To urge the rocker and clutch elements to normal position, we employ a compression spring 278 which telescopes the shaft 92 and acts between the bracket 93 and the end wall of the slidable member 91 of the clutch.

Like the upper compartment actuating knob 76, the lower compartment knob 77 is returned to its normal or inoperative position under the influence of a spring 279, one end of which is anchored to an enlarged hub portion of the shaft 250, the opposite end of the spring being anchored to a pin 280 fixed to the front wall of the stationary part of the housing. A pin 281, likewise fixed in the housing is arranged to engage the end of an arcuate slot 282 formed in the inner surface of the hub of the hand knob so as to define a limiting or normal position of the parts.

In the description of the operation of upper compartment knob 76, it was pointed out that the coin cylinders 111, 113 and 114, would be simultaneously actuated, thereby imparting movement to shaft 120 and its fingers 129 and 132. Furthermore, it will be recollected that the finger 132 alone was involved in the opening of the upper compartment. Now considering the means employed to disable finger 129, which as will hereinafter be seen, is effective to release the lower compartment door.

Shaft 140, Figs. 2 and 3, upon which the pusher collar finger 145 is keyed, is telescoped throughout its lower end by a sleeve 286 which carries a collar finger 284 functionally and structurally similar to the collar finger 145. Collar finger 284 is aligned with release finger 129 and arranged to be driven thereby. Thus movement of shaft 120 and its release fingers 129 and 132 would normally exert a rocking influence on shaft 140 through collar finger 145, and a similar movement would be communicated to the sleeve 286 through collar finger 284. Collar finger 284 is locked, however, when knob 76 is rotated to release the upper compartment door. To this latter end, a rocker arm 287 is pivotally supported on the stud 266, its upwardly extending arm being provided with a roller 288 which normally engages a short cam groove 290 in the peripheral surface of the hub of clutch element 89. The downwardly projecting bifurcated arms of rocker 287 are formed with bearing edges 291 which engage the bifurcated arm 292 of a lever 293 pivoted on a fixed stud 294. A second arm 295 of lever 293 extends rearwardly to overlie the forwardly projecting end 297 of a lever 298 pivoted intermediate its ends on a stud 299. A rearwardly projecting arm 300 of lever 298 is turned upwardly to form a portion 301, the upper end of which projects through an aperture 302 in the shelf 105.

A comb plate 303 fixed to the under surface of the shelf 105 guides the upper end of arm 300 for reciprocatory movement in slot 302. A tensile spring 304, acting between arm 300 of lever 298, and a fixed pin in the frame of the machine, tends to rotate lever 298 in a clockwise direction.

Now referring again to tubular sleeve 286 on shaft 140; adjacent its lower end, and spaced above the shelf 105, sleeve 286 is provided with a collar 306, the peripheral edge of which collar is formed with a slot 307. As shown in Figs. 2 and 3, when upper compartment knob 76 is in its normal, or rest position, the upper end of arm 301 of lever 298, stands below the collar 306. When knob 76 is rotated, however, lever 293 will be rocked in a clockwise direction by rocker 287, with the result that arm 295 of lever 293 will move lever 298 in counterclockwise direction, thereby shifting the upper end of arm 301 from the position shown in Fig. 3, into engagement with notch 307 of collar 306. As a consequence of the last mentioned sequence of movements, the sleeve 286 on shaft 140 will be locked against rotation. Thus when shaft 120 is rotated, door release finger 129 will remain stationary, spring 130 yielding because collar finger 145 is fixed to sleeve 286. Hence collar finger 145 will be prevented from acting to open the lower compartment door.

The upper compartment door release finger 132, is disabled when a lower compartment is to be opened, by means similar to that previously described for the disablement of finger 129:

As shown particularly in Figs. 2 and 3, a bifurcated arm 310 of a lever 311 projects upwardly to a position in which it is adapted to partake of the movement of the upwardly extending arm of rocker 265. Lever 311 is pivoted on the stud 294, and like the lever 293, is formed with a rearwardly extending arm 315 which overlies an arm 316 of a lever 317 pivoted on the stud 299. Lever 317 is formed with an upstanding end 320 which projects through the aperture 302, in shelf 105. A tensile spring 321, acting between the upstanding arm 320 of lever 317 and a fixed pin in the frame of the machine, tends to rotate lever 317 in a clockwise direction.

A collar 322, fixed to shaft 140 between collar 306 and the shelf 105, is formed with a notch 323 which is adapted to receive the upper end of arm 320. Now when the door release knobs are in idle position as shown in the drawings, arm 320 is disengaged from notch 323 in collar 322. When the lower compartment knob 77 is operated, rocker 265 will act upon arm 310 of lever 311, thereby forcing arm 320 to the leftward as viewed in the drawings against the action of its spring 321. Thus the upper end of arm 320 will engage notch 323 in collar 306 to lock shaft 140 against movement, with the result that collar finger 145a will be prevented from actuating the upper compartment door release mechanisms.

In connection with the description of the operation of lower compartment door knob 77, it was shown that the clutch 90 of the upper compartment door mechanism would be disabled. Similarly, when the upper compartment door knob 76 is operated, the clutch 253 associated with the lower compartment door operating mechanism is also disconnected. To this end the downwardly projecting arm of rocker 287 is provided with a roller 325 which rides in a peripheral groove 326 formed in the hub portion of the slidable part 256 of clutch 253. Now when knob 76 is rotated with a consequent movement of rocker 287 in a counterclockwise direction, the roller 325 will draw the clutch part 256 to the right so as to disengage the latter from clutch member 255, and hence from the knob 77.

Like the lower compartment operating knob, the knob 76 is urged in a counterclockwise direction by a coil spring 328 which surrounds the hub of the short shaft 85. One end of the spring 328 is anchored to the hub, its opposite end being connected to a pin 329 fixed to the body portion 75. An arcuate slot 330 formed in an enlarged portion of the hub is arranged to coact with a fixed pin 331 in the front wall 75, to arrest the knob in the position shown in the drawings as well as to limit clockwise rotation thereof.

It has been shown that the shaft 140 is provided with a pusher lever 146, adapted through intermediate connections to actuate a latch 158, which, among other latches, controls the opening of upper compartment door 159.

Similarly, the sleeve 236, above collar finger 284 is fitted with a pusher lever which may be connected to one arm of a bell crank 336 by a pusher link similar in all respects to the link 149 of Fig. 5. Bell-crank 336 is structurally and functionally similar to the bell-crank 148 of Fig. 9. It will be recalled that bell-crank 148 is fixed to the external one of three telescoping shafts and such is the relationship of bell-crank 336 of Fig. 2.

Thus, the bell-crank 336 is fixed to a sleeve shaft 337 the forward end of which is arranged to actuate a latch finger 338 similar to the latch 158 of Fig. 10. A sleeve 339, within the sleeve 337, carries a bell-crank 340 adapted to be rocked through a pusher link 341 and a collar finger on shaft 170 not unlike the collar finger 172. A central shaft 343 which telescopes within both the sleeves 337 and 339, carries a bell-crank 344 arranged to be actuated by a pusher link 345 and a collar finger similar to the finger 173 on shaft 171.

The sleeve 339 actuates a latch finger 346 and the sleeve 343 actuates a latch finger 347, the latter two fingers being functionally and structurally similar to the fingers 191 and 196 respectively, as shown in Fig. 6.

The nest of shafts 337, 339 and 343 are supported by bearing brackets 350 and 351 which depend from the floor 352 of the upper compartment 63.

The latch fingers 338, 346 and 347 are arranged to be received between the rear surface of the lower compartment door 353 and a bracket 354 fixed to the rear surface of the door.

The invention further embodies means to simultaneously disable all of the latches of either compartment as might be necessary, for example, when access to the interior of any compartment becomes necessary for the purpose of effecting repairs for servicing the mechanism. In this connection, as is shown in Figs. 9, 11 and 27, the upper group of bell-cranks 148, 181 and 183 underlie a bail 360 carried by plunger 361 which projects upwardly through the top wall of the upper compartment and is surmounted by a shouldered head 362. A compression spring 363 acting between the upper surface of the top wall of the compartment, and the under surface of shoulder 362, tends to maintain the latter and its bail 360 in its raised, or inoperative position. However, when it is desired to simultaneously release all three latches 158, 191 and 196, depression of shouldered head 362 will serve to rock the bell-cranks 148, 181 and 183 in a clockwise direction as viewed in Fig. 9 to effect the desired purpose.

The bell-cranks 336, 340 and 344 associated with the lower compartment door latches 338, 346 and 347 are adapted to be disabled by means of a bail 365 (Fig. 27) which is similar in all respects to the bail 360. An irregularly shaped operating rod 366 projects upwardly from the bail 365 through the top wall of the upper compartment and is surmounted by a shouldered operating knob 367 generally similar to knob 362. A compression spring 368, acting between the top of the upper compartment and the under surface of the operating knob 367 tends to maintain bail 365 in ineffective position.

Now coming to the package ejecting mechanism more fully disclosed in Figs. 12, 13, 14, 15, 16, 17 and 18. Each one of the pairs of upper and lower compartments is provided with means to eject or deliver a unit of the particular item carried therein as an incident to opening of the compartment door.

It will be recollected in connection with the description of the door releasing mechanism, that release of the door under control of the structure shown in Figs. 2 and 12, serves only to unlock the door. This unlocking operation serves to subject the door to the influence of a spring 400, one end of which, as shown in Fig. 12, acts upon the bottom wall 401 of the compartment, the body of the spring being wound about the pivotal support 402, upon which the door is mounted. The second end of the spring 400 is extended to a point on the inner surface of the door itself and the tendency of the spring is to move the door from its fully closed position to that shown in dotted outline at 403 in Fig. 12. It is contemplated that once the door has been released and moved to the dotted line position shown at 403 that the purchaser will grasp the knob 404 and open the door to the horizontal position indicated at 405 in the same figure. This manual operation on the part of the purchaser serves to prepare mechanism automatically effective to eject a unit of the article contained in the compartment, and simultaneously functions to condition mechanism effective to restore the door to its fully closed and latched position as shown by the positions at both compartment doors in Fig. 2. More particularly, a door closing link 406, pivotally connected to a rearwardly projecting lug 407 formed on the inner surface of the door, extends rearwardly to connect at 408 with an arm 409 of a rack link 410 pivotally supported at 411 by a stud carried by the side wall of the compartment. Rack link 410 includes an arm 412 formed with a camming slot 413 which operates upon a roller 414 carried by a slide 415.

Fixed to the floor 401 of the compartment, is an irregularly shaped bearing bracket 420. A gear 421 journalled on a stud 422 in bracket 420, meshes with rack 417 and is adapted to alternately drive or be driven by the rack. A spring drum 423 is fixed to one face of gear 421 and functions to urge the latter to move in a clockwise direction, that is, in a door closing direction. More specifically, the spring drum 423 is provided with a spring 424, one end of which, as indicated at 425, is anchored to the internal surface of the drum. The second end of the spring, as shown at 426, is fixed to the stationary bearing stud 422, hence counterclockwise movement of gear 421 will serve to tension the spring 424.

A cam disk 430 likewise journalled on stud 422, and pinned to both gear 421 and spring drum 423, is arranged to control the movement of the latter two parts. As shown in the drawings, the cam disk is provided with a radially extending slot 431 which is formed by a laterally turned stop 432 and a camming lip 433 so as to receive a pin 434 carried by one arm 435 of a lever 436. Lever 436 is pivotally supported on the horizontal surface of a shelf 437 which is formed by turning the upper edge of bearing bracket 420 laterally. Lever 436 is pivoted intermediate its ends on a stud 438 which engages the shelf 437, and a spring 439, acting between stud 438 and arm 435 of lever 436, tends to rotate the latter in a clockwise direction as viewed in Fig. 14. A pin 440, carried by the shelf 437 engages a notch 441 formed in an arm 442 of lever 436 so as to define a limiting position of clockwise movement of the lever in which pin 434 on arm 435 is in position to abut stop 432 on cam disk 430.

Now considering the mechanism arranged to be actuated as an incident to rotation of gear 421 and its associated cam disk 430 and spring drum 423. As shown in Figs. 12 and 15, a pinion 445 journalled on a stud carried by bearing bracket 420 meshes with gear 421. A second pinion 446, likewise journalled on bracket 420, meshes with the pinion 445 as well as with a rack 447. Referring now to Figs. 12 and 16, the rack 447 is fixed to a plate 448 which underlies the bottom wall 401 of the compartment. Plate 448 is supported for free reciprocatory movement by a bearing bracket 449 which underlies the bottom wall of the compartment and is secured thereto by means such as an integrally cast lug 450 and bolts 451. It will be understood that plate 448 extends longitudinally of the compartment, its extreme right edge as viewed in Fig. 17, being somewhat to the right of the center line of the compartment. A longitudinally extending slot 452 is formed in bottom wall of the compartment and a screw or other fitting 452—A projects therethrough from the plate 448 to engage a false bottom plate 453 which slides upon the bottom wall 401 of the compartment.

Adjacent its right-hand end, as viewed in the drawings, the false bottom 453 carries an abutment 455. Such an abutment is associated with each compartment of the machine, as is illustrated in Fig. 12.

When the door of a compartment is in its closed position, as illustrated by the upper compartment in Fig. 12, the abutment lies in substantial alignment with the forward edge of the stack of cartons associated with that particular compartment. When the compartment door occupies its open position, as shown by the lower compartment door in Fig. 12, the abutment lies to the rear of the stack of packages in that compartment. Thus during the cycle of operations involved in placing the required coins in the machine, releasing, opening, and closing the door, the abutment moves from the forward edge of its stack of cartons to a position rearwardly of the rear edge of the stack, and then returns to the forward edge. In this last mentioned abutment returning movement, the next package or carton is delivered to the forward end of the compartment in readiness for removal in the next door opening operation.

In the upper compartment of Fig. 12, the package in readiness to be withdrawn upon the opening of the door is indicated in dotted outline at 460, the supply of reserve cartons is indicated by the stack 461 which will be seen to be carried in a chute, or well 462.

In the lower compartment the package ready to be withdrawn is indicated at 463. The reserve stack of cartons for the bottom compartment is shown at 464 and the well, or chute, in which the stack 464 is carried, is identified by the numeral 465.

It will be understood that abutment 455 as used in all compartments is structurally the same so that the following detailed description is applicable to the abutments of both upper and lower compartments. As shown in Figs. 16 and 17, the body of the abutment is generally rectangular in contour with its longitudinal dimension extending across the width of the compartment as is shown in Fig. 17. Intermediate its front and rear longitudinal edges 466 and 467 respectively, the upper surface of the body of the abutment is cut away to define a longitudinally extending channel 468. Furthermore, the front edge 466 is formed with a rectangularly shaped notch or recess 469, to provide clearance for the depending end of an apron 470 which, as will be seen in Fig. 16, is pivoted adjacent its upper edge 471 to the front wall 472 of the well, or chute, in which the packages are stored. Apron 470 is adapted for free pivotal movement in a clockwise direction from the position shown in Fig. 16, but is restrained against counterclockwise movement from the same position by virtue of the fact that its pivotal axis is spaced above the lower edge of wall 472.

When the abutment reaches its extreme forward position of travel, its rear edge 467 as indicated in Fig. 16, will underlie the forward edge of the next package in the stack, and the apron 470 will drop from the top surface of the last package to be ejected into the longitudinal channel 468. The position of the last package to be ejected is shown at 473 in Fig. 16 and the apron 470, at this phase of the cycle of operations, will be seen to be in a position to engage the right-hand edge of package 473 as the abutment commences its return excursion. Thus apron 470 will effectively prevent the package 473 from being returned to the stack of packages which in this figure are indicated at 475.

While the forward edge of the stack is maintained in the position shown by the rear edge 467 of abutment 455, the rear edge of the stack is prevented from dropping into the path of the abutment by means of a pair of similar three bladed supporting elements 480 pivotally supported at 479 on the rear wall 476 of the carton well.

Now referring to the lower compartment of Fig. 12 for a better understanding of the elements 480: They consist of two coplanar blades 481 and 482 which lie in the pivotal axis of the elements, and a normally disposed blade 483 whose plane intersects the pivotal axis. Leaf spring 485, fixed to the rear wall of the compartment extends downwardly to engage the rearwardly projecting one of the blades, the lower end of the spring being cupped as shown to yieldably restrain the elements against rotation.

Now as the abutment moves forwardly from the position shown in the lower compartment of Fig. 12, its forward edge engages the blade 481 thereby causing the element 480 to commence a clockwise movement. As the leftward excursion of the abutment continues, the blade 483 rotates downwardly out of engagement with the spring 485, the depth of the channel 468 in the abutment being such as to freely receive the blade. As the blade 481 reaches a horizontal position underlying the next carton above that one which is being ejected, the blade 482 will be brought into engagement with the cup shaped end of leaf spring 485. As the leftward movement of the abutment continues, the necessity of providing for blade 483 to clear the rear wall of the abutment becomes apparent.

To this end the rear edge 467 of the abutment is formed with two downwardly extending slots 486 which register with and are of such size as to permit free passage of the abutment beyond to downwardly extending blade 483.

Hence, the forward excursion of the abutment is permitted to continue, the blade 481 meanwhile having been rotated into a position to underlie the rear edge of that one of the cartons which is immediately above the one presently being ejected by the abutment.

As has been explained, the rear edge 467 of the abutment will support the forward end of the stack of cartons while the abutment occupies its extreme leftward position as shown in dotted outline in Fig. 16. It will now be clear that the stack of cartons will be maintained out of the path of the abutment as the latter commences its return excursion to the position occupied in the lower compartment of Fig. 12.

Now coming to the method of dropping the next succeeding carton into the path of the abutment after the latter reaches its extreme rightward position. Referring again to the dotted outline position in Fig. 16, it will be seen that as the return excursion of the abutment progresses, the support for the forward edge of the stack of cartons is withdrawn and finally when the forward wall 466 of the abutment engages the downwardly turned blades 483, the blades 481 supporting the rear edge of the stack will also be withdrawn. Finally, as the abutment reaches position shown in the lower compartment of Fig. 12, the next lowest package in the stack will have dropped into the path of the abutment in readiness for the next ejecting excursion of the latter.

To preclude the possibility of misoperation as might occur as a result of a partial opening of the compartment door, with a resultant incomplete cycle of abutment 455, we provide the following means:

A so-called full stroke mechanism is provided by the formation of a plurality of aligned apertures adjacent the left-hand edge of plate 448 as viewed in Fig. 18. As shown in greater detail, in Fig. 12, the beforementioned apertures include five of equal diameter as indicated at 380 and two end apertures 381 and 382 of relatively greater diameter. A dog 383, pivotally mounted on a stationary support 384 which is fixed to the side wall of the compartment is adapted to coact with apertures 380, 381 and 383. Dog 383 is of such dimensions that it cannot be fully received in any one of the apertures 380, but can be freely accommodated in the end apertures 381 and 382. When the abutment 455 is in its extreme right-hand position of travel as shown in the upper compartment of Fig. 12, dog 383 will freely drop into aperture 381.

Referring now to the lower compartment of Fig. 12, it will be understood that as the plate 448 moves to the left, that it will successively engage each one of the several apertures 380. During each such engagement with apertures 380, the dog 383 will assume the dotted line position shown in Fig. 16 and as will be apparent, it will be impossible to reverse the direction of plate 448 until the latter has moved so as to align dog 383 with aperture 381. Hence when a compartment door is once partially opened, the cycle of operations must be completed by movement of the door to its full open position, thereby insuring delivery of the next package to the compartment as the door is finally closed.

Similarly, when the door is fully opened and the closing operation commenced, it becomes impossible to reopen the door without having completed the closing operation.

After a compartment door has been opened and the contents thereof removed, the door is automatically returned to locked position. To this latter end, a cam disk 490, generally similar to cam disk 430 is journalled on a stud 491 which, like the stud 422, is carried by the bearing bracket 420. Likewise mounted on the stud 491, and yieldably connected to the disk 490 is a spring drum 492. The yieldable connection between disk 490 and drum 492 is provided by a coiled spring 495 which is pinned to the disk at 496 and extends in a counterclockwise direction around stud 491 to be pinned at its opposite end to the body of the spring drum at 497. In addition the yieldable connection between the spring drum and disk, the former part is yieldably maintained in the position shown in Fig. 15 by a coil spring 498 which is anchored at 499 to the inner surface of the drum and at 500 to the stationary stud 491.

The cam disk 490 is formed with a peripheral aperture 501 defined by a laterally turned lug 501—A. A downwardly projecting stud 502 carried by arm 442 of lever 436 is arranged to lie in the aperture 501 when the parts are in their "door closed positions" as shown in Fig. 13.

The movement of spring drum 423 which occurs as an incident to a door opening operation, is communicated to the spring drum 492 through the medium of a tape 503 which is anchored adjacent its ends to both drums.

Now as a door opening operation is commencing the cam lip 433 on disk 430 causes stud 434 on lever arm 435 to ride on to the front face of disk 430. This movement communicated to stud 502 causes the latter to move from a position just forward of the face of disk 490 into a position to abut the stop 501—A. Hence while cam disk 430 is rotating during the opening operation, its companion disk 490 is locked against movement by the stud 502. As the opening operation progresses, it will be evident that the movement communicated to spring barrel drum 492 through tape 503 will compress spring 495 thus creating a bias on the part of cam disk 490 to rotate in a counterclockwise direction. Simultaneously, the compression of spring 498 within the spring drum itself will store energy tending to rotate the spring drum in a counterclockwise direction.

Now as the door opening operation is completed, the slot 431 in cam disk 430 again comes into alignment with stud 434 whereupon the latter drops into the position shown in solid outline in Fig. 14. The stud 502 meanwhile was moved out of position to block the cam disk 490. Thus the latter part, under the bias of spring 495 immediately commences to rotate in a counterclockwise direction. The violence of the movement thus set up by spring 495 is cushioned by any desirable form of air cylinder 510 carried by an extension 511 of the bearing bracket 420. Air cylinder 510 includes a piston 512 which is connected to cam disk 490 by a crank 513 journalled on stud 514 in disk 490. Toward the end of the rotary movement of cam disk 490 in a counterclockwise direction, a cam lip 515, struck outwardly from its surface engages the stud 502 so as to cam the latter rearwardly into the path of stop 501. This last mentioned movement of stud 502 will rock lever 436 so as to disengage stud 434 from stop 431. Cam disk 430 as well as spring 498, is thereby freed to rotate under the influence of spring 424, as a result of which the gear 421 will be rapidly rotated in a clockwise direction under the energy stored in both springs so as to accomplish a rapid door closing operation.

It will be understood that when cam disk 430 completes the beforementioned movement, the stud 434 will again drop into notch 431 thereby removing stud 502 from notch 500 so as to leave the parts in their initial or idle positions.

Now coming to the coin handling elements of the device:

The front wall 66 of the stationary coin receiving head 65, which surmounts the top of the machine (Figs. 1 and 12), is formed with three coin slot apertures 520, 521 and 522 which may be adapted to receive nickels, dimes and twenty-five cent pieces respectively, it will be understood that the opposite end wall of part 65 (not shown) may be formed with similar apertures to receive similar coins.

Apertures 520 to 522 inclusive communicate with similar inclined coin runways 523 which extend from the openings in the respective end walls of the part 65 to a point overlying and closely adjacent the upper surface 524 of a universally supported intermediate coin device 525. Coin device 525 (Figs. 2 and 5) is supported adjacent its upper surface 524 by a conventional gimbal ring system including a ring 526 journalled on diametrically opposed pins 527. Pins 527, in turn, are journalled in stationary bearing brackets 528. Gimbal ring 526 is provided with inwardly projecting pins 529 which describe a diameter of the ring normally disposed to the axis of pins 527. Pins 529 engage suitable bores formed adjacent the upper end of the body of part 525, as a consequence of which the latter is permitted a slight degree of universal movement so as to compensate for any angularity of the machine, such as would result from its being placed upon an inclined driveway. It will be understood that the respective coin runways 523 communicate at their lower ends with corresponding channels in the body of the intermediate coin device 525. Thus the coins pass from the coin runways to the bottom of the intermediate coin device 525 and thence into separate coin chutes 530, 531 and 532, the lower ends of which overlie the coin cylinders 111, 113 and 114.

Provision is made for the return of coins which may have inadvertently been dropped into the machine. As shown in Fig. 2, a coin return knob 78 is effective to simultaneously release such coins as may then be in all of the coin cylinders 111, 113 and 114. Return knob 78 is carried on a short shaft 540 adapted for reciprocatory movement. Rearwardly of knob 78, the shaft 540 carries a collar 541 which is slidably fitted in a cylindrical bracket 542 fixed to the rear surface of, and communicating at its forward end with an aperture of equal diameter termed in the front surface of wall 75. The rear wall of bracket 542 is formed with an aperture adapted to slidably receive shaft 540, and the latter is urged in a leftward direction, as viewed in the drawings by a coiled spring 543 which acts between the collar 541 and the inner, or bottom wall of the bracket 542. A pin 544, fixed to shaft 540, limits leftward movement of the shaft at the point where collar 541 is flush with the outer surface of wall 75. An intermediate shaft 545 is slidably supported in the lower ends of the bearing brackets 88 and 93, in axial alignment with shaft 540. The normal position of this intermediate shaft is such that its forward end 546 is spaced from the inner end of shaft 540. A collar 547, fixed to shaft 545 in a position to abut bearing bracket 88, serves to limit leftward movement of the shaft under the influence of a spring 548 which acts between a collar 549 and the bearing bracket 93. The inner, or right hand end of shaft 545, as shown at 549, is spaced from the headed end 550, of a shaft 551, slidably supported in the bearing bracket 101. A coiled spring 552, acting between the head 550 of shaft 551, and the inner end of a bore formed in bracket 101, yieldably urges shaft 551 to the left, as viewed in the drawings.

Adjacent its right-hand end, shaft 551 is provided with a camming nose 555 which is pinned to the shaft and normally abuts bracket 101 so as to define a leftward limit of travel of its shaft.

Figure 29:
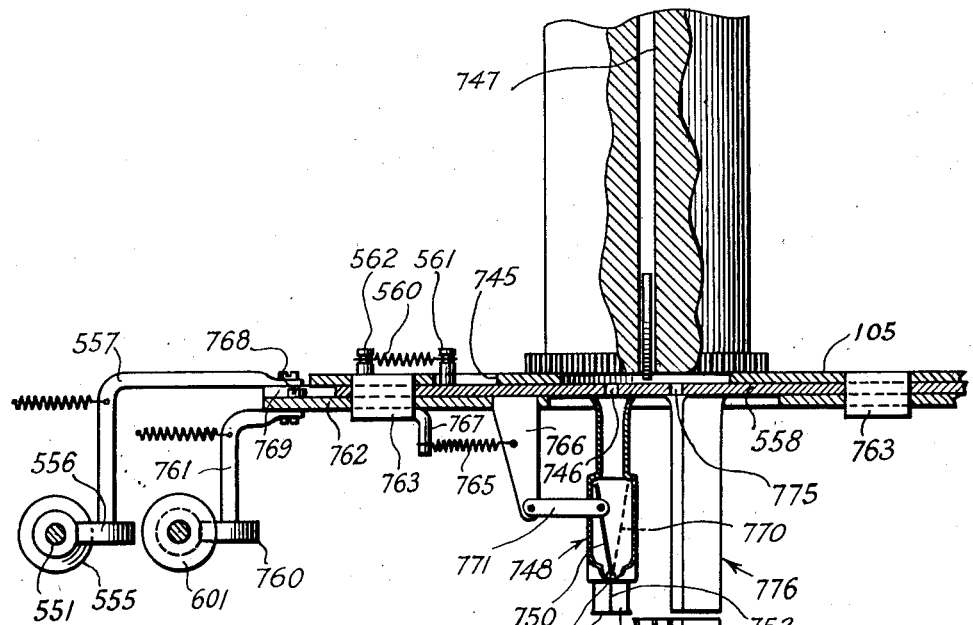
Fig. 29 is an enlarged fragmentary view of the structure underlying the coin cylinders of Fig. 2.
Figure 30:
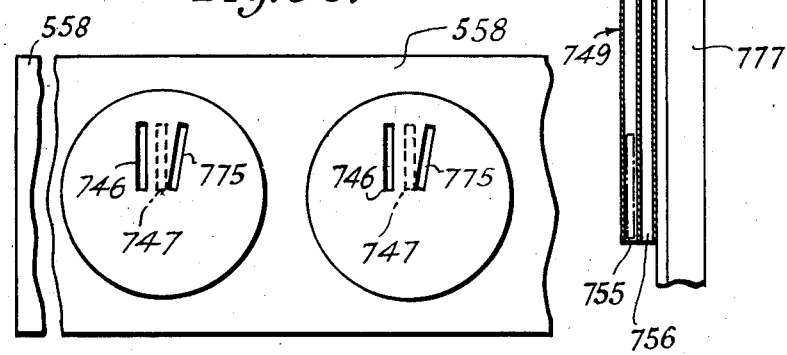
Fig. 30 is a top plan view of the structure underlying the coin cylinders of Fig. 29.

Referring now to Figs. 28, 29 and 30, the camming nose 555 of shaft 551 is arranged to engage a roller 556 carried on an arm 557 which is pinned adjacent its upper end to a slidable plate 558, which underlies the shelf 105 upon which the coin cylinders are journalled. Plate 558 is normally urged in a leftward direction as viewed in Fig. 29 by a tensile spring 560 which acts between a pin 561 carried by the plate, and a fixed pin 562 supported on shelf 105. An elongated aperture 745 formed in shelf 105, permits free reciprocatory movement of pin 561. Plate 558 is formed with three spaced parallel apertures 746, the normal position of which, as viewed in Figs. 29 and 30, is to the leftward of the coin slots 747, of each of the respective coin cylinders. Furthermore, in the normal or rest position of the coin cylinders their respective slots lie parallel with the apertures 746 in plate 558. A short chute-like element 748 is fixed to the lower surface of plate 558 in underlying relation with respect to each of the apertures 746 so as to be moved with the plate. The lower ends of the chute elements 748 lie closely adjacent, but spaced above and to the left of the upper ends of three similar groups of chutes generally indicated at 749 in Fig. 29.

Now when the coin return knob 78 is actuated, camming nose 555 will function to move plate 558 to the right so as to align its aperture 746 with the slot 747 in the related coin cylinder. This last mentioned movement of plate 558 will also serve to move the respective chute elements 748 into alignment with the underlying nests of chutes 749.

The chute element 748 contains a baffle plate 750 pivoted at its lower end as indicated at 751 on an axis extending parallel to the slot 746. As will be seen in Fig. 29, the lower end of element 748 is partitioned by a wall 752 which extends from the pivotal axis of the plate 750 to the lower end of the elements, thus providing in effect two independent coin chutes 753 and 754.

Similarly, the nest of chutes 749 includes a pair of chutes 755 and 756, the relationship of the parts being such that when the element 748 is moved into position to receive a coin in the coin cylinder, its respective chutes 753 and 754 will be in axial alignment with the chutes 755 and 756. It will suffice to point out that when the apertures 746 in plate 558 are brought into alignment with the coin cylinder slots 747, that the coins thus released will drop into contact with the baffle plate 750 and thus be deflected into either the chute 755 or 756. As viewed in Fig. 28, the chutes 756 communicate with the chute 560 so that all of the coins thus released by operation of release knob 78 will be returned to the coin return cup 79.

In connection with the description of the operation of the machine, it was pointed out that the upper, or movable part of the device was rotated to position any desired pair of compartments in position to be opened by operation of the knobs 76 and 77. Means is provided to prevent the insertion of coins in the stationary coin receiving head 65, except when the device is in some one of the positions in which it is possible to actuate the door opening mechanism. In this connection, we have provided means to effectively block the coin slots 520, 521 and 522, in all instances, except those in which the machine is indicated as being in readiness for operation, as shown by the alignment of the arrow 68 on the head 65, with one of the marks 69 on the hand rail 67.

As shown particularly in Fig. 12, the last mentioned means comprises a reciprocatory plunger 565 journalled in a bearing 566 formed in the lower portion of the stationary head 65. Plunger 565 is normally urged in an upward direction by a coiled spring 567 which telescopes its upper end and acts between a fixed collar 568 on the plunger, and the bottom wall 569 of the head 65. Adjacent its lower end, the plunger carries a roller 570, which is arranged to ride on the lower edge of rail 67. Referring now to Fig. 1, the lower edge of rail 67 is formed with spaced arcuate notches 571, one such notch being provided in each position of the upper rotating part of the machine in which the arrow 68 coincides with one of the marks 69. In other words, the position of the notches 571, when engaged by the roller 570 of plunger 565, corresponds with a position of the machine in which the operating knobs 76 and 77 are effective to open an upper or lower compartment door.

A lever arm 573, supported intermediate its ends on a slidable bearing 574 carried in the stationary head 65, is arranged to be actuated by plunger 565. The inner end of lever 573 is pivotally connected to the upper end of plunger 565, and the outer end of the lever is articulated to the plate 578 which is guided for movement in close proximity to the inner surface of the front wall 66 of head 65.

Now when plunger 565 is depressed against the action of its spring 567; as will be the case when roller 570 engages those sections of the under surface of the rail which lie intermediate the notches 571, lever 573 will be rocked in a clockwise direction to elevate the upper edge of plate 578 sufficiently to obstruct any effort to insert a coin in any one of the openings 520, 521 and 522. On the other hand, when the machine is rotated, so as to permit roller 570 to engage any one of the arcuate notches 571, plunger 565 will rise under the influence of spring 567, thereby rocking lever 573 in a counterclockwise direction so as to withdraw the upper edge of plate 578 from its slot obstructing position.

Reverting now to Figs. 1, 2 and 12, it will be recalled that several elements of the mechanism of the machine have been described as being supported upon the shelf 105. As viewed in Fig. 1, the shelf 105 lies above a shelf 580 and is supported with respect thereto by a central column 581. As particularly shown in Fig. 2, column 581 is provided with a collar 582 which underlies the shelf 105 so as to define the lower limit of movement thereof. Furthermore, the shelf 105 is formed with a bearing 583 which is arranged to receive the column 501. Similarly, the upper bearing plate 106 is formed with a bearing 584 adapted to engage the column 581. Thus, in assembling the machine, the shelf 105 and its related bearing plate 106 are dropped into position on the central column 581.

Now referring to the vending compartments as shown in Fig. 5. The rotatable head 10 is formed with an uneven number of pairs of compartments 63 and 64. In the present embodiment of the invention 13 such pairs of compartments have been employed as is indicated by the compartment designating numerals 590. From a further examination of Fig. 5, it will be seen that the pair of compartments corresponding to designating numeral "1" are in position to be operated by the door releasing knobs 76 and 77. Furthermore, it will be apparent that the use of an uneven number of compartments precludes the possibility of any other pair of compartments being diametrically opposite the ones presently in position to be opened. In this connection, it will be recalled that the stationary coin receiving head 65 extends diametrically across the machine and is provided with a second set of coin apertures not unlike the apertures 520, 521 and 522 of Fig. 1. It will be understood that this diametrically opposite set of coin slots communicate with the intermediate coin receptacle 525 (Fig. 2) as do the beforementioned coin slots of Fig. 1.

Furthermore, it will be recollected that the lower stationary part of the device is provided with a second set of operating knobs corresponding to those shown in Fig. 1 (76, 77, 78) at a point diametrically opposite the first set so as to permit of operation of the compartments from either side of the machine. It will now be seen that although two complete sets of operating knobs are provided, it is none-the-less impossible to simultaneously operate both sets because the beforementioned uneven number of compartments prevents more than one pair from being operatively aligned with the actuating knobs at any one time.

A driving connection between the second set of operating knobs and the particular one of the compartment door release mechanisms with which they may be aligned, is shown in Fig. 2.

Thus a shaft 595, journalled in bearing brackets 596 and 597 is provided with one element 598 of a coupling effective to engage the coupling element 98 of shaft 97. At its inner end, the shaft 595 carries a bevelled pinion 599 which meshes with pinion 103 on coin cylinder operating shaft 104. Supported below shaft 595 in the bearing brackets 596 and 597 is a slidable shaft 600, the inner end of which as indicated at 601, carries a camming nose identical with the nose 555 of shaft 551. Shaft 600 is normally urged to the right as viewed in the drawings by a coiled spring 602 which acts between the inner end of a bore in the bearing bracket 596 and a fixed collar 603 secured to shaft 600. The right-hand end of shaft 600 is formed with a shouldered head 604 which is adapted to align with one or the other of the coin return knobs when any pair of compartments is in position to be opened.

The camming nose 601 of shaft 600 is arranged to co-act with a roller 760 carried by an arm 761 which in turn is pinned to a slidable plate 762 which underlies the plate 558. The plates 558 and 762 are supported in bearing engagement below the shelf 105 by similar bearing straps 763.

Movement of the plate 762, as will be occasioned by operation of the coin return knob on that side of the machine opposite from the return knob 78, will serve to release any coins then in the coin cylinders for delivery to a coin return cup similar to the cup 79, through a chute 764 (Fig. 28) similar in all respects to the chute 560.

Referring specifically to Fig. 29, the plate 762 is normally urged in a leftward direction by a tensile spring 765 which acts between a downwardly projecting bracket 766 fixed to plate 762 and a pin 767 which is rigid with the bearing 763.

Movement of plate 762 to the right from the position shown in Fig. 29, is effective to shift the plate 558 to the point where the chute element 748 is aligned with the coin slots 747. To this latter end plate 762 is provided with a lug 768 which operates in a slot 769 formed in the plate 558. In the normal position of lug 768, it lies substantially midway between the ends of slot 769 so that a delay occurs between the time of beginning the movement of plate 762, and engagement of lug 768 with plate 558. The delay thus effected between the movement of plates 762 and 558 is availed of to shift the baffle plate 750 from the position shown in the drawings in solid outline, to that indicated at 770 in dotted outline. To this end the lower end of arm 766 is fitted with a link 771, the right-hand end of which is pivotally connected with baffle plate 750.

Now it will be apparent that in the beginning of a rightward excursion of plate 762, that link 771 will function to rock the baffle plate 750 from its normal position to that shown in dotted outline at 770. Momentarily thereafter, the lug 768 will engage the right-hand end of slot 769 in plate 558 to move the latter, and consequently the chute element 748, to the right, into alignment with the slots in the coin cylinders. The coins thus released are permitted to fall into chute element 748 where the baffle plate 750 serves to guide them into chute 753 and thence to chute 755.

Referring now to Fig. 28, each of the chutes 755 terminates in the return chute 764, which, as has been indicated, communicates at its outer end with a coin return cup similar to the cup 79 of Fig. 2. Hence, the device includes provision for the return of coins to either side of the machine, depending upon which coin return knob has been manipulated.

In connection with the operation of the device, it was demonstrated that the presence of the required numbers of coins in the coin cylinders, and the subsequent rotation of the cylinders would function to rotate the fingers 121, 167 and 168 from the positions shown in Fig. 5 to the position indicated in Fig. 7. In this latter position of the coin cylinders their respective slots are brought into register with the apertures 775 (Fig. 30) which are formed in the plate 558. Supported below each of the apertures 775 is chute element 776 of substantially the same length as the chute elements 748. The chute elements 776 are normally aligned with underlying chutes 777 which are directed into a centrally disposed coin collecting chute 778 (Fig. 28) which in turn communicates with a coin collection box 779 which may be removably positioned upon the shelf 580 (Fig. 1).

Referring now to Fig. 30, in which a plan view of the plate 558 is shown: it will be seen that the apertures 775 are normally in position to receive coins which are dropped from the coin cylinders at the completion of a rotary movement thereof for the purpose of opening a compartment door. Furthermore, as has been indicated, the chute elements 777, which underlie the apertures 775 are aligned with the coin collection chutes 777 which in turn lead to the coin collection box 779. The normal position of the plate 558, however, is such as to prevent the possibility of coins being dropped either into the collection box or returned to the coin return cups unless the coin cylinders are rotated, or one, or the other of the coin return knobs are manipulated.

We have provided means to automatically indicate the exhaustion of the stock of cartons carried in any compartment of the device.

In this latter connection, we utilized a self contained source of electrical energy in the form of a battery 650, which is removably supported on a shelf or platform 651, in the lower or stationary part of the device.

Referring now to Figs. 25 and 26, the battery 650 is electrically connected to independent collector rings 652 and 653 by conductors 654 and 655. As shown in Fig. 3, collector rings 652 and 653 are supported by, and insulated from the stationary shelf 105, similar annular rings of any desirable insulating material 656 being employed for this purpose. As will be noted in Fig. 3, the rings 652 and 653 are concentric and arranged to be engaged by independent brushes 657 and 658. Brushes 657 and 658 are supported by and insulated from the rotatable upper section of the device. In this instance, the brushes may be connected directly to the under surface of the horizontal section of rear wall 81, a segment of insulating material 660 serving to prevent short circuiting of the brushes.

In Fig. 25, we have illustrated a circuit from the brushes 657 and 658 which is effective to automatically illuminate either one or both of two independent lamps 661 and 662 dependent upon whether an upper, a lower or both upper and lower compartments are exhausted. The lamp 661 is associated with an upper compartment and automatically responsive to the condition of that compartment, whereas lamp 662 is arranged to automatically indicate the condition of the corresponding lower compartment. More particularly, the circuit arrangement of Fig. 25 includes a conductor 665 extending from the brush 657 and having a connection with a spring contact finger 656. Contact finger 666 is mounted upon the rear wall of the lower compartment and insulated therefrom by a block of insulating material 667. Spring finger 666 extends below its support 667, its lower end being turned inwardly at 668 to project through a suitable aperture in the rear wall of the well so as to yieldably engage the next to last carton therein as shown in the drawing. Intermediate its lower end 668, and support 667, the spring finger 666 is formed with an electrical contact 669 which is arranged to engage the contact point 670 of a second spring finger 671, which for purposes of convenience is carried by the support 667. Spring contact 671 is electrically connected to one terminal of the lamp 662 by a conductor 672 and a circuit is completed through the lamp by a conductor 673 which in turn is electrically connected to a conductor 674 in circuit relation with the brush 658.

Now when the last carton in the well has dropped into the position identified by numeral 675, that is, when the last carton is in position to be ejected by the abutment 555, the lower end 668 of contact finger 666 is permitted to move to the left so as to establish a circuit through its contact point 669 to the finger 671, thence through conductor 672 to the lamp 662. From the lamp 662, the circuit returns to brush 658 and thence to the battery 650 through conductors 673 and 674. Hence it will be apparent that the lamp 662 will be illuminated automatically as an incident to the dropping of the last carton in the well into position to be ejected by the abutment 455.

The circuit to the warning lamp 661 and the elements of that circuit will now be understood. Thus conductor 655 is extended to a conductor 680 which in turn is connected to a spring finger 681 generally similar to the previously described finger 666. Finger 681 is mounted, and electrically insulated from, the rear wall of the upper compartment well at 682, and is arranged to establish a circuit to a spring finger 683 when the last carton in the well drops below the inwardly turned lower end 684 of finger 681. A conductor 685 extends from the finger 683 to one terminal of the lamp 661, and a conductor 686 completes a circuit from the lamp to the conductor 674, and thence back to brush 658, collector ring 653 and the battery 650. The upper part of the device may be constantly illuminated by a lamp 687 in permanent circuit relation with the battery 650 through conductors 665 and 674. A switch 688 in conductor 655, intermediate the battery 650 and collector ring 653, is effective to make or break the circuit to the collector ring and thus to the warning lamps 661 and 662 and the general illuminating lamp 687.

In Fig. 26 we have illustrated an alternative form of warning circuit to indicate when the respective compartment wells are exhhausted.

The source of electrical energy may be the battery 690 which it will be understood corresponds to the battery 650 of Fig. 25. Electrical conductors 691 and 692 are connected between the battery 690 and the collector rings 693 and 694. Like the collector rings 652 and 653, the rings 693 and 694 are mounted on the under surface of the shelf 155 of Fig. 2 and a pair of brushes 695 and 696, supported on and insulated from the under surface of the horizontally turned portion of the rear wall 81, are arranged to separately establish electrical contact with the collector rings. A conductor 697 extending from the brush 695 is connected to a spring contact finger 698 by a short conductor 699. The spring finger 698 is mounted on, and insulated from, the rear wall of the lower compartment carton well at 700, its downwardly extending free end 701 being arranged to project through a suitable aperture formed in the rear wall of the well. When the lower end of spring finger 701 is forced to the right as will be the case when there are cartons in the well, an electrical circuit will be established to a white lamp 702 through a conductor 703, which in turn is connected to a spring finger 704 mounted in spaced parallel relation from the finger 698 on the support 700. The return circuit to the battery, from the white lamp 702, is established by a conductor 705 which in turn is connected to the conductor wire 706, which is in circuit relation with the brush 696 and hence the collector ring 694.

When the last carton has dropped into position to be delivered by the abutment 455, the lower end of spring finger 698 moves to the left as viewed in the drawings to establish a circuit with a third spring finger 707. The spring finger 707 is mounted on the support 700 in spaced, insulated relationship from both fingers 698 and 704. A conductor 708 extends from the finger 707 to a red lamp 709, and a return circuit from the latter is completed through a conductor 710 to the conductor 705 and thence through 706, brush 696, collector 694 and conductor 692 to battery 690.

In the circuit just described, it will be seen that so long as the carton well contains two such cartons, the spring finger 698 will maintain a circuit relation to the white lamp 702, but that when the last carton has dropped into position to be delivered into the compartment by the abutment 455, the circuit to lamp 702 will be broken and a circuit to red lamp 709 established.

The condition of the upper compartment in the circuit arrangement of Fig. 26, is indicated by a white lamp 715 which is illuminated so long as more than one carton remains therein, and by a red lamp 716 which is illuminated when the last carton is in position to be ejected. The conductor 697 is extended upwardly to be connected to a spring finger 717 mounted on, and insulated from the rear wall of the upper compartment well by a block of insulating material 718. The lower end of spring finger 717 projects through an aperture formed adjacent the lower end of the rear wall as does the corresponding end of finger 698 of the lower compartment. So long as two cartons remain in the compartment, the lower end of finger 717 is held to the right, where it forms an electrical circuit with a spring finger 719 which in turn is connected to one terminal of lamp 715 by a conductor 720. A conductor 721 extends from the second terminal of lamp 715 to the conductor 706, and thence back to brush 696. Hence, the white lamp 715 is illuminated so long as two cartons remain in the well. When the last carton has dropped into position to be ejected by the abutment, spring finger 717 moves to the left to form a circuit with a spring finger 722 which in turn is electrically connected to one terminal of the red lamp 716 by a conductor 723. The second terminal of lamp 716 is electrically connected to conductor 721 by a conductor 724.

A white lamp 723 which corresponds with the lamp 687 of Fig. 25 is connected in circuit relationship with the conductors 697 and 706 for general illuminating purposes at the top of the machine. A switch 727, connected in series between the battery 690 and collector ring 694 is effective to make and break the circuit to all of the lamps of Fig. 26.

In Fig. 24 we have illustrated a method of lighting the individual compartments of the device. The battery indicated at 730 is connected to collector rings 731 and 732 by conductors 733 and 734. It will be understood that the battery and collector rings of this circuit are identical with the corresponding parts shown in Figs. 25 and 26 and may be similarly disposed in the device. A brush 735 on the rotatable head 10 establishes a circuit with collector ring 731, and a similar brush 736 establishes a circuit with collector ring 732. A conductor 737 connected to the brush 735 forms one side of a circuit, the return element of which is provided by a conductor 738 connected to the brush 736. A plurality of lamps 739, 740 and 741 such as would be employed in the several compartments of the device are connected in parallel across the conductors 737 and 738 as clearly indicated, and a lamp 742, like the lamps 687 and 725, is utilized to illuminate the top of the machine. It will be understood that one or more lamps of the type of lamps 739 to 741 inclusive may be employed to illuminate the front face of the compartment by being placed under the downwardly projecting edge of the top surface 745 of the rotatable head as clearly indicated in Fig. 12.

The present embodiment of the invention is capable of great flexibility in the handling of coins for the purpose of controlling the opening of compartment doors. In this connection attention is now directed to Figs. 19 and 20 in which we have illustrated a coin cylinder identical with those heretofore discussed in connection with Figs. 2 and 5, namely, cylinders 111, 113 and 114; and a chart of the various combinations of coins which the cylinders are arranged to handle.

At the outset, it will be understood that each of the three coin cylinders 111, 113 and 114 is formed with a plurality of generally horizontally extending slots 122 which, as will be understood from an examination of Fig. 5, intersect the vertical channels in the cylinders into which the coins fall. For simplicity of manufacture, each of the cylinders 111, 113 and 114 is provided with the same combination of slots 122 and the coin actuated fingers 121, 167 and 168 of Figs. 2, 3 and 5 are selectively positioned to register with any desired combination of the slots 122.

It will be seen that the slots 122 are identified by the letters A to L inclusive in Fig. 19. Referring back to Fig. 20 it will be apparent that the slot "A" is formed at such a height above the bottom of the coin cylinders that the diameter of the top one of six 10¢ pieces will coincide substantially with the horizontal axis of the slot.

Similarly, the slot "B" is formed on a level above the bottom of the cylinder at such a height that the diameter of the top one of five 5¢ pieces will substantially coincide with the horizontal axis of the slot.

The remainder of the coin combinations provided by slots D, E, F, G, H, J, K and L will be obvious.

Reverting now to Figs. 2 and 4; it will be recollected that the upper compartment operating knob 76, the lower compartment operating knob 77, and the coin return knob 78, are connected with their respective driving mechanisms when any pair of compartments are in position to be operated, as shown by the alignment of the pointer 69 on the stationary coin receptacle 65 (Fig. 1) with any one of the marks 69 on the hand rail 67. The couplings 86 and 251, associated with the knobs 76 and 77 respectively, return to the positions shown in Figs. 2 and 4 at the conclusion of every door opening operation, so as to permit the inner ends of the respective shafts upon which the knobs are mounted, to freely disengage from the companion elements of the couplings. In this way, free rotation of the compartments and the mechanisms underlying each is made possible without interference from the inner ends of the shafts upon which knobs 76 and 77 are carried. It will now be understood that the construction of the parts of the coin release mechanism, and particularly the relationship between the short shaft 540 and the headed end of shaft 545, will permit similar flexibility with respect to these parts. Furthermore, the coupling 98—99 returns to the position shown in the drawings at the conclusion of each cycle of operations so that this connection too, permits free rotation of the vending head with respect to the coin cylinder driving means.

Likewise, the inner end of shaft 545, as will be remembered, is spaced from the head end of coin release shaft 552 so as to freely clear the latter when the rotating upper portion of the machine is moved.

Similarly, it will be recollected that the bell cranks 295 and 315 are provided with a separable driving connection with the bell cranks 551 and 552, and are only brought into operative engagement with the latter parts when a pair of compartments is moved into position to form a driving engagement between the knobs 76, 77 and 78, the mechanism underlying the compartment and the coin cylinder driving shaft 100.

We claim as our invention:

1. In a machine of the character described, the combination of a single group of movable coin cylinders adapted to receive coins of different denomination, a plurality of groups of shafts arranged to be selectively moved into position to be actuated by coins in said coin cylinders, a plurality of pairs of vending compartments, one such pair of compartments being identified with each of said last mentioned groups of shafts, a door in each of said compartments, means effective to normally maintain each said door in closed locked position, means operated by said shafts to selectively operate one or the other of said door locking means, and manipulative means operable to actuate said group of coin cylinders to impart movement to the selected group of shafts to operate the selected door locking means.

2. In a portable vending machine of the character described, the combination of a chassis, a vending head rotatably supported on said chassis, a plurality of independent vending compartments arranged around said head, a door on each of said compartments, locking means on each said door, means operable to operate said locking means, a stationary coin receptacle surmounting said rotatable head, a group of movable coin cylinders arranged to receive coins from said receptacle, manual means operable to move said cylinders when any compartment occupies a predetermined position, and means arranged to be actuated as an incident to movement of said cylinders to selectively operate said door locking means.

3. In a portable vending machine of the character described, the combination of a chassis, a vending head rotatably supported on said chassis, a plurality of independent vending compartments arranged around said head, a door on each of said compartments, means to lock said doors, means operable to operate said lock means, a stationary coin receptacle surmounting said rotatable head, a group of movable coin cylinders arranged to receive coins from said receptacle, and manual means operable to move said cylinders to cause coins therein to selectively actuate said door lock operating means.

4. In a portable vending machine of the character described, the combination of a chassis, a vending head rotatably supported on said chassis, a plurality of independent vending compartments arranged around said head, a normally locked door on each such compartment, means operable to open said doors, a stationary coin receptacle surmounting said rotatable head, a group of movable coin cylinders arranged to receive coins from said receptacle, and manual means operable to move said cylinders to cause coins therein to selectively actuate said door opening means.

5. In a portable vending machine of the character described, the combination of a chassis, a vending head rotatably supported on said chassis, a plurality of independent vending compartments arranged around said head, a normally locked door on each of said compartments, means operable to open said doors, a group of movable coin cylinders on said chassis arranged to receive coins of different denomination identified with predetermined amounts required to open each particular door, said head being rotatable to position any compartment in juxtaposition with said coin cylinders, and manually operable means to actuate said cylinders to selectively operate the door opening means of the compartment so positioned.

RAYMOND LOEWY.
HARRY A. DREW.